(12) United States Patent
Boyen et al.

(10) Patent No.: US 7,509,492 B2
(45) Date of Patent: Mar. 24, 2009

(54) DISTRIBUTED SCALABLE CRYPTOGRAPHIC ACCESS CONTROL

(75) Inventors: Xavier Boyen, Mountain View, CA (US); Zhenyu Qian, Cupertino, CA (US); Dan Teodosiu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 738 days.

(21) Appl. No.: 10/473,264

(22) PCT Filed: Mar. 27, 2002

(86) PCT No.: PCT/US02/10030

§ 371 (c)(1),
(2), (4) Date: Sep. 26, 2003

(87) PCT Pub. No.: WO02/078238

PCT Pub. Date: Oct. 3, 2002

(65) Prior Publication Data

US 2004/0123104 A1    Jun. 24, 2004

Related U.S. Application Data

(60) Provisional application No. 60/309,340, filed on Jul. 31, 2001, provisional application No. 60/306,490, filed on Jul. 18, 2001, provisional application No. 60/279,287, filed on Mar. 27, 2001.

(51) Int. Cl.
*H04L 9/00* (2006.01)
(52) U.S. Cl. ............... 713/165; 380/30; 380/259; 380/267; 380/281; 380/282; 380/283; 380/284; 380/285

(58) Field of Classification Search ............ 380/30, 380/259, 267, 281–285, 256; 713/165
See application file for complete search history.

(56) References Cited

U.S. PATENT DOCUMENTS

| | | | |
|---|---|---|---|
| 6,178,505 B1 * | 1/2001 | Schneider et al. | 713/168 |
| 6,202,150 B1 | 3/2001 | Young et al. | |
| 6,249,866 B1 | 6/2001 | Brundrett et al. | |
| 6,351,813 B1 | 2/2002 | Mooney et al. | |
| 6,510,516 B1 * | 1/2003 | Benson et al. | 713/167 |
| 2002/0064279 A1 * | 5/2002 | Uner | 380/44 |
| 2002/0077988 A1 * | 6/2002 | Sasaki et al. | 705/59 |
| 2003/0177093 A1 * | 9/2003 | Hirano et al. | 705/50 |

* cited by examiner

*Primary Examiner*—Tongoc Tran
(74) *Attorney, Agent, or Firm*—Merchant & Gould, P.C.

(57) ABSTRACT

Published resources are made available in an encrypted form, using corresponding resource keys, published through resource key files, with the publications effectively restricted to authorized peer systems only by encrypting the resource keys in a manner only the authorized peer systems are able to recover them. In one embodiment, the resource keys are encrypted using encryption public keys of the authorized peer systems or the groups to which the authorized peer system are members. In one embodiment, the encryption public keys of individual or groups of authorized peer systems are published for resource publishing peer systems through client and group key files respectively. Group encryption private keys are made available to the group members through published group key files. Further, advanced features including but not limited to resource key file inheritance, password protected publication, obfuscated publication, content signing, secured access via gateways, and secured resource search are supported.

102 Claims, 15 Drawing Sheets

DISTRIBUTED SCALABLE CRYPTOGRAPHIC ACCESS CONTROL

RELATED APPLICATION

This application claims priority to provisional applications
(a) No. 60/279,287, entitled "Scalable and Secure Access Control For Peer Resources via Encryption and Cached Keys", filed on Mar. 27, 2001;
(b) No. 60/306,490, entitled "A Distributed Scalable Cryptographic Access Control Infrastructure", filed on Jul. 18, 2001; and
(c) No. 60/309,340, entitled "A Distributed Scalable Cryptographic Access Control Infrastructure", filed on Jul. 31, 2001.

The specifications of these provisional applications are hereby incorporated by reference.

BACKGROUND OF THE INVENTION

1. Field of the Invention

The present invention relates to the field of security in distributed systems. More specifically, the present invention relates to methods and systems associated with enforcing access privileges and restrictions in decentralized networks, and their applications to the secure publication of content in peer-to-peer networks.

2. Background Information

Recent advances in broadband technology are prompting a shift from the established client-server model of the World Wide Web to a paradigm in which end-user machines can interact directly with each other. In this new model, called peer-to-peer computing, interactions between users are no longer constrained to go through a centralized server, but can take place directly between end-user machines themselves.

Interactions that are better carried out in a peer-to-peer fashion include the transfer of large volumes of data (such as images, music files, or video clips) or highly volatile information (such as office documents being edited by several people at once), and distributed applications that run on multiple machines (such as real-time distributed games where nodes use Web services to interact with each other, or business-to-business applications that are built around a Web services interaction model). Peer-to-peer computing enables three novel aspects that are not appropriately supported by the World Wide Web:

Frictionless publication of content: In a peer-to-peer system, every peer machine is both a consumer and a publisher of information. Publishing information in such a system can be as easy as creating a new file.

Low barrier to revision and synchronization: Published files can be edited and updated by their author or any person having write permission on the file, either on the local machine or remotely. Synchronization is achieved transparently by the peer-to-peer infrastructure by keeping track of the current version of the published resources, and of which peer machines are caching the correct version.

Active role of peer machines: While on the World Wide Web user machines are mainly passive participants, in a peer-to-peer environment those machines can become an active part of distributed applications that span many peers. For instance, in a distributed game application, every participant machine runs a copy of the game software.

One of the most promising benefits of the peer-to-peer model is the ability to seamlessly "cache" resources on multiple machines, both to provide robustness against one particular source of content going off-line, and to maximize the download performance by transparently selecting the fastest and closest possible source(s) of a download.

However, this model poses a series of difficulties for distributing restricted content. This is due to the multiplicity of peer providers for any given content, and the fact that those peer providers are operated by users and thus escape the direct control of a central trusted administration authority. The traditional approach to access control, based on centralized authorities (such as directory servers), would lose most of the efficiency benefits provided by the peer-to-peer model.

The main challenges of the peer-to-peer model with respect to access control include the following issues:

Distributed operation: In large peer-to-peer systems, it is necessary that most of the effort be performed by the providers and consumers of information, thereby involving centralized servers as little as possible. An access control infrastructure for a peer-to-peer network must be mostly distributed, while at the same time being both secure and efficient.

Compatibility with caching: As one of the main benefits of the peer-to-peer model is the ability to replicate resources to distribute the load, it is necessary that the access control infrastructure integrate seamlessly with the content replication and caching.

High volume scalability: To accommodate extensible networks with potentially hundreds of millions of users, it is necessary that the access control mechanism be highly scalable.

Traditional approaches to distributed or semi-centralized access control are based on an "authentication-based" model, in which users are authenticated, and access lists are checked, before access requests may be granted. The authentication schemes vary, but are usually based on either of:

The Kerberos model, in which trusted servers vouch for the authenticity of a consumer to a producer.

The Public Key Infrastructure (PKI) model, in which peers are authenticated using a hierarchy of certificates rooted in a trusted authority.

Unfortunately, authentication quickly becomes impractical and inefficient when the size of the network grows. It also raises concerns when used with a large-scale caching mechanism, as it behooves to all the cachers of a resource to enforce the same access rights as specified by its original publisher. This approach has a number of other problems, which are recapitulated below:

All cachers need to be trusted that they correctly enforce authentication and access control policies. A single compromised cacher can damage the security of the entire system.

Cachers will need to maintain up-to-date access lists for all cached resources, and enforce a strict policy of checking credentials before granting any content.

Cachers can only cache resources which they are themselves granted access to.

The burden of enforcing access properties lies with the publisher and all cachers of a resource, as opposed to the recipient.

It is difficult to verify the legitimacy of a user's request, when such legitimacy derives from the user's membership to a group (or chain of groups).

There is a feeling of inadequacy to have a large number of cachers maintain clear-text copies of restricted material.

Finally, it is necessary to establish a secure communication channel between requestor and cacher, for every download request. This could be achieved either via a Kerberos-like protocol (which would require extra communications to a heavy duty central ticket server), or an SSL-like protocol between clients (which is computationally expensive and incurs a large set-up time). Either approach would cause undesirable overhead in the communication process.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes a distributed, scalable cryptographic based methodology for controlling access to published resources by peer systems. In the description to follow, various aspects of the present invention will be described. However, the present invention may be practiced with only some or all aspects of the present invention. For purposes of explanation, specific numbers, materials and configurations are set forth in order to provide a thorough understanding of the present invention. However, the present invention may be practiced without some of the specific details. In other instances, well known features are omitted or simplified in order not to obscure the present invention.

Parts of the description will be presented in terms of operations performed by a processor based device, using terms such as resources, data files, executables, directory, sub-directory, publishing, accessing, determining and so forth, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical, electrical and/or optical components of the processor based device.

The term "resource" as used in the present application includes directories, sub-directories, non-executable data files of all types, as well as executable binaries or dynamic entities such as Web services, whereas the term "processor" includes microprocessors, micro-controllers, digital signal processors, and the like, that are standalone, adjunct or embedded.

Various operations will be described as multiple discrete steps in turn, in a manner that is most helpful in understanding the present invention. However, the order of description should not be construed as to imply that these operations are necessarily order dependent. In particular, these operations need not be performed in the order of presentation.

Further, the description repeatedly uses the phrase "in one embodiment", which ordinarily does not refer to the same embodiment, although it may; and the terms "comprising", "having", "including", and other terms of the like, as used in the claims as well as in the specification are synonymous.

Overview

Figure 1:
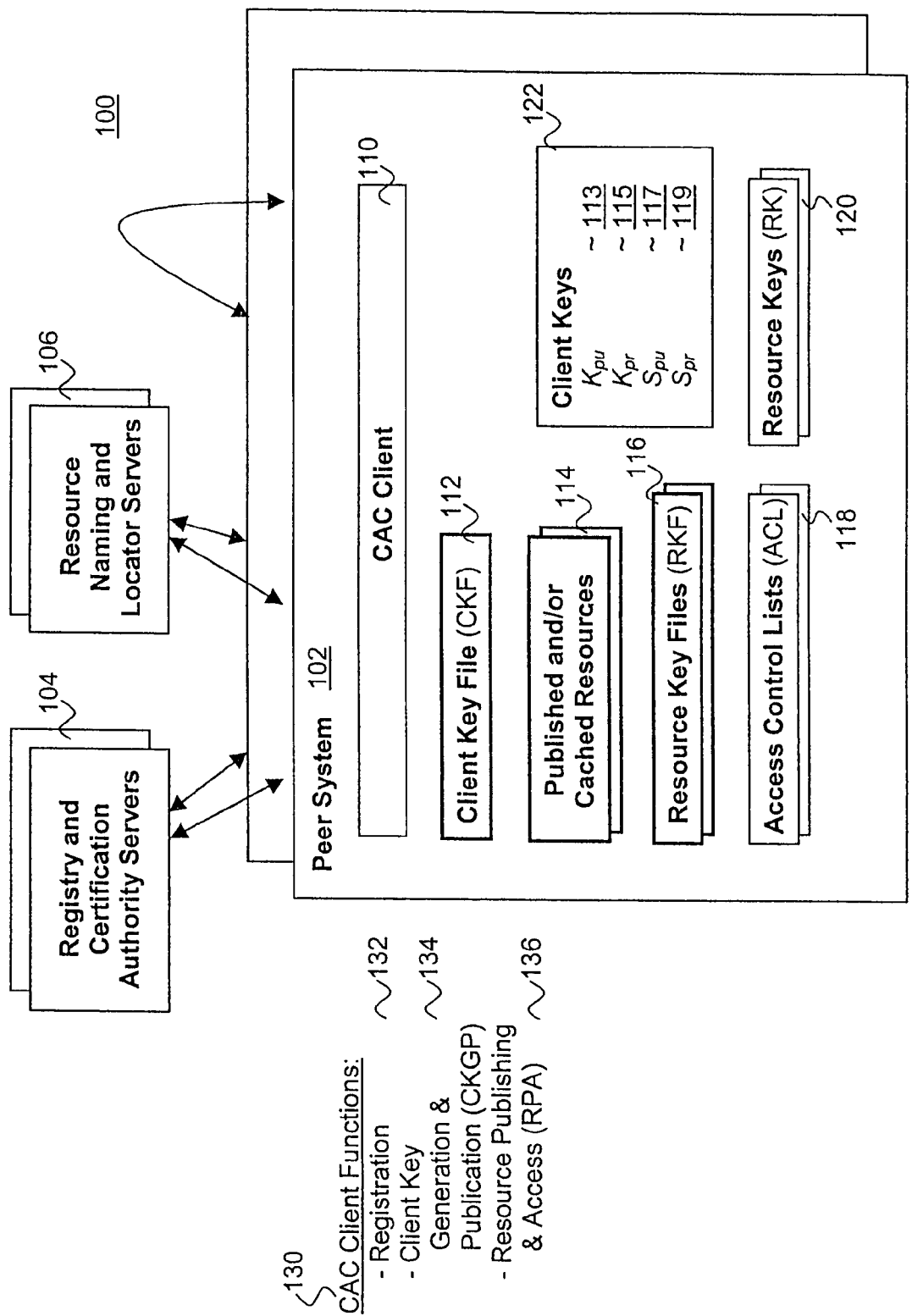
FIG. 1 illustrates an overview of the present invention, in accordance with one embodiment.

Referring now first to FIG. 1, wherein a block diagram illustrating an overview of the present invention, in accordance with one embodiment, is shown. As illustrated, for the embodiment, peer systems 102, with the assistance of registry and certification authority servers 104 and resource naming and locator servers 106, publish and share resources with one another. As alluded to earlier, the published/shared resources may include but are not limited to directories, sub-directories, non-executable data types of all forms, executable binaries, as well as dynamic entities such as Web services.

In accordance with the present invention, peer systems 102 are each incorporated with cryptographic access control (CAC) client 110 of the present invention to facilitate publication of resources, and access to the published resources, with access control. CAC clients 110 are incorporated with the teachings of the present invention, enabling publication and consumption of resources with access control to be effected more efficiently and the responsibilities borne more fairly, in a distributed and scalable manner, by all peer systems. As will be described in more detail below, the distributed manner of effecting access control to the published resources, for the embodiment, employs encryption public keys of the individual peer systems, or groups of peer systems, to be authorized to access the published resources.

For the illustrated embodiment, in addition to facilitating publication of resources and access of the published resources with distributed access control, CAC client 110 also facilitates registration of peer systems 102 with registry and certification authority 104, as well as generation and publication of encryption public keys of peer systems 102. In particular, for the embodiment, the set of CAC client functions 130 of client 110 are correspondingly provided through the resource publishing and access function 136, the registration function 132, and the client key generation and publication function 134, respectively. Together, these functions enable peer systems 102 to effect the desired distributed, scalable cryptographic based control for accessing published resources.

Except for the teachings of the present invention, peer systems 102, registry and certification authority servers 104 and resource locator servers 106 represent a broad range of these elements known in the art. Further, while for ease of understanding, the present invention is being described with peer systems 102, registry and certification authority servers 104 and resource locator servers 106 as separate entities, as those skilled in the art will appreciate, these are mere logical divisions; a system may assume the role of a publisher peer system 102 at one point in time, and that of a consumer peer system 102 or registry/certification authority server 104 or resource locator server 106 at another point in time. Moreover, the present invention may be practiced with or without employing third party registry and/or certification authority servers.

Basic Resource Publishing and Sharing Without Access Control

Continuing to refer to FIG. 1, the basic manner in which peer systems 102 publish and share resources 114 without access control will first be described. In this Figure, as well as in all subsequent Figures, published resources are depicted as bold boxes. Note that the present invention does not preclude peer systems 102, while practicing the present invention, from nevertheless electing to publish and share resources without access control for selected ones of the published resources, presumably resources of lesser importance in term of content value, or resources intended for distribution to a broad audience.

The basic manner of resource publication and consumption without access control may be illustrated by the example scenario of a user Alice of a first peer system 102 wishing to share a resource with Bob and Charlie of a second and a third peer system 102 respectively. Assuming all three peer systems 102 are properly installed with resource publication and access functions (such as CAC client 110), and registered with appropriate resource naming and locator servers 106, the basic resource publication/access process without access control, for the embodiment, works as follows:

1. Alice of first peer system 102 uses her CAC client 110 (more specifically, resource publication & access (RPA) function 136) to cause the publication of the resource. Her CAC client 110 (RPA function 136) transmits the name and version of the resource to the assigned resource naming and locator server 106. In a preferred embodiment, resource names take the form of Universal Resource Locators (URLs), although other naming schemes could be used in alternate embodiments.

2. When Bob of second peer system 102 tries to access the resource, Bob's CAC client 110 (RPA function 136) intercepts the request and queries the assigned resource naming and locator server 106 for the resource, which responds by providing the address of Alice's peer system 102. Bob's CAC client 110 (RPA function 136) then connects to Alice's CAC client 110, and retrieves the resource from Alice's peer system 102, in a peer-to-peer fashion. Assuming that this is a static resource (such as a document stored in a file), Bob's CAC client 110 (RPA function 136) also caches a copy of the resource on Bob's peer system 102.

3. Upon successful receipt of the resource, Bob's CAC client 110 (RPA function 136) notifies the resource naming and locator server 106 that it now has a cached copy of the resource, and is ready to serve it.

4. Subsequently, when Charlie of third peer system 102 tries to access the resource, the resource naming and locator 106 returns the address of Alice's peer system 102 (the original publisher), as well as the address of Bob's peer system 102 (who now is a cacher). Charlie's CAC client 110 (RPA function 136) may obtain the resource from either Alice or Bob's peer systems 102. However, if Alice's peer system 102 had gone off-line in the meantime, the resource would still be available from Bob's peer system 102—in which case only Bob's address would be returned by the resource naming and locator service 106.

5. If at a further later point in time, Alice revises the resource, her CAC client 110 (RPA function 136) will inform the resource naming and locator service 106 that a new version is available, resulting in the invalidation of all existing cached copies. In a preferred embodiment, this invalidation is achieved by having resource naming and locator service 106 purge all of its records about invalid cached copies; in the example above, resource naming and locator service 106 would purge its records about Bob and Charlie's copies.

6. At another later point in time, if Bob tries to access the resource, the resource naming and locator service 106 will now direct the request to Alice's peer system 102, disregarding Bob's own cached copy as obsolete.

The above scenario illustrates the basic principle of resource publication, caching and sharing—as provided by the underlying sharing infrastructure without access control—over which the distributed access control invention herein described may be practiced. The protocol for resource publication, caching and. sharing with distributed access control is described in more detail in turn in subsequent sections.

Resource Keys, Access Control Lists, Resource Key Files and Client Key Files

Figure 2:
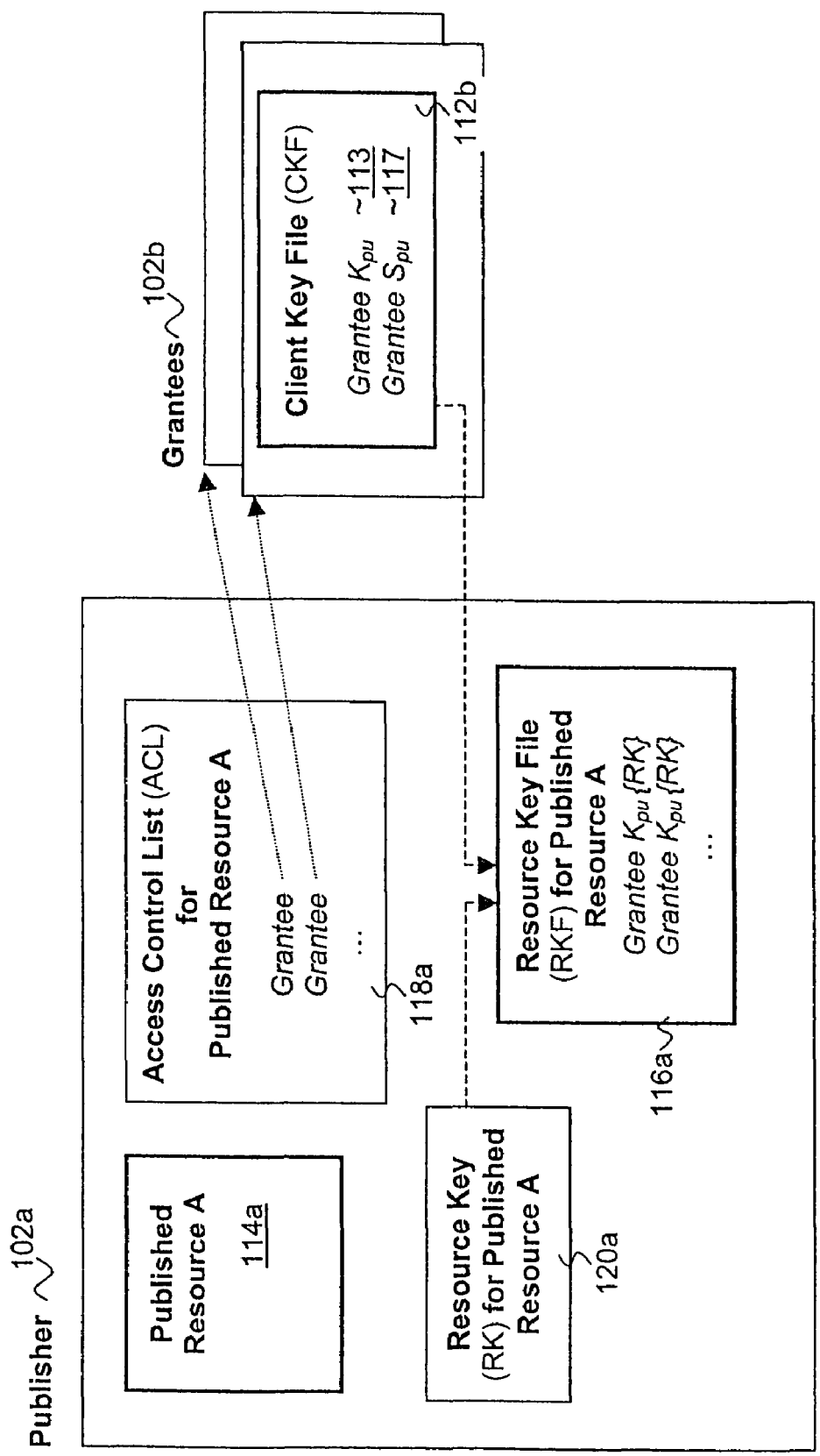
FIG. 2 illustrates the logical relationship between a published resource, its resource key, access control list and resource key file of a publisher peer system, and client key files of consumer peer systems of FIG. 1 in further detail in accordance with one embodiment.

Referring now also to FIG. 2 (in addition to FIG. 1), various elements of the distributed access control of the present invention, in accordance with one embodiment, will be described. The present invention contemplates that a published resource, such as resource 114*a*, will be distributed in an encrypted form. For the embodiment, distributed copies of published resources 114 are encrypted by corresponding resource keys 120 generated by resource key generation and publication function 134. In various embodiments, resource keys 120 generated are symmetric keys, such as symmetric keys of random bit strings of a given length, designed for use by symmetric ciphers. Examples of symmetric ciphers include but are not limited to the Rijndael (a.k.a. AES) or triple-DES algorithms well-known to those skilled in the art.

Resource keys 120 are published or made available by resource key generation and publication function 134 only through corresponding resource key files 116 of the published resources. Effective access to published resources 114 is restricted to authorized peer systems 102, by effectively restricting accesses to resource keys 120 required to decrypt and recover published resources 114. Specifically, for the embodiment, accesses to resource keys 120 are effectively restricted to authorized peer systems 102 by only including resource keys 120 in resource key files 116 in an encrypted form. More specifically, multiple encrypted entries of a resource key 120 for a published/distributed resource 114 are generated and included in the corresponding resource key file 116 of the published resource, with each entry of resource key 120 encrypted using the encryption public key (Grantee $K_{pu}$) 113 of the authorized peer system 102. As a result, only authorized peer systems 102 are able to recover resource keys 120, and in turn recover the content of the published resources 114.

In various embodiments, client key generation and publishing function 134 signs the resource key files 116, to facilitate their authentication by authorized peer systems 102. The resource key files 116 may be signed using any one of a number of signature techniques known in the art.

For the embodiment, the encryption public keys Grantee $K_{pu}$ 113 of potential consumer peer systems 102 are published or made available by resource key generation and publishing function 134 to all publisher peer systems 102 through client key files (CKF) 112, published in the conventional manner, i.e. without any access control.

As will be described in more detail below, in one embodiment, the encryption public key 113 published in a client key file 112 may be an encryption public key of a group to which the ultimate grantee or authorized peer systems 102 are members. However, for ease of the understanding, the present invention will first be described with the authorization or access grant being directly given to individual peer systems 102. The "group" aspect of the present invention will be described in more detail later.

Further, as will be also described in more detail below, resource key file 116 may also include other entries in support of other advanced features of the present invention, e.g. an encrypted entry of the corresponding resource's signature.

Registration and Initialization of Potential Consumer Peer Systems

Figure 3:
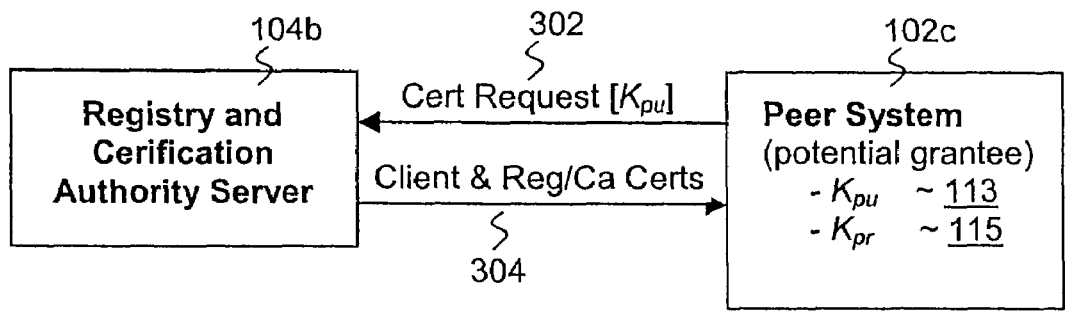
FIG. 3 illustrates the registration operation flow for a potential consumer peer system under the present invention, in accordance with one embodiment.
Figure 4:
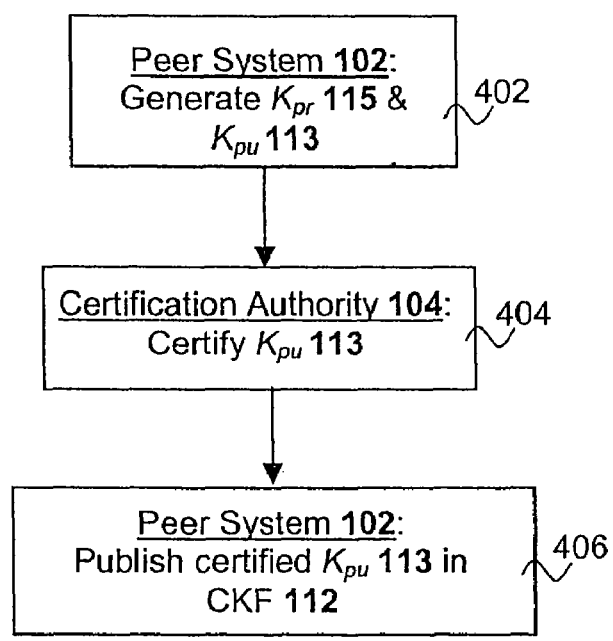
FIG. 4 illustrates the initialization operation flow of a potential consumer peer system for publishing its encryption public key for use by resource publishers to authorize the peer system access to selected ones of their published resources under the present invention, in accordance with one embodiment.

FIGS. 3-4 illustrate the operational flow of the present invention for registering and initializing a potential consumer peer system 102 to practice the present invention, in accordance with one embodiment. As illustrated in FIG. 4, a peer system 102 interested in being able to be granted access to resources published in accordance with the present invention, first generates or selects a pair of encryption public and private keys ($K_{pu}$ 113 and $K_{pr}$ 115, respectively), using e.g. client key generation and publication function 134, block 402. Thereafter, for the embodiment, the peer system 102 (more specifically, registration function 132) contacts a participating registry and certification authority server, e.g. server 104b, by sending message 302 in FIG. 3. The peer system 102 (more specifically, registration function 132) registers itself and requests the certification authority to certify, or cryptographically sign, its encryption public key $K_{pu}$ 113, block 404. For the embodiment, in response, the certification authority 104b cryptographically signs the encryption public key $K_{pu}$ 113 of the registering peer system 102, and returns the signed encryption public key 113 to the registering peer system 102 in message 304 of FIG. 3. In turn, the peer system 102 (more specifically, client key generation and publication function 134) places the cryptographically signed encryption public key $K_{pu}$ 113 in a client key file (CKF) 112, and (via resource publishing and access function 136) publishes the client key file 112 for use by publishers of resources, block 406. Publication of a client key file 112 for the embodiment, as described earlier, is accomplished in a conventional manner without access control, i.e. by notifying an assigned resource naming and locator server 106 of the name and version of the client key file 112.

In a preferred embodiment, the present invention may be practiced with peer system 102 (more specifically, client key generation and publication function 134) signing and/or certifying its own encryption public key $K_{pu}$ 113 instead. For the embodiment, the peer system 102 (more specifically, client key generation and publication function 134) generates both a signing key pair ($S_{pu}$ 117 and $S_{pr}$ 119, respectively) and an encryption key pair ($K_{pu}$ 113 and $K_{pr}$ 115, respectively). For this embodiment, the certification authority 104 certifies the signing public key $S_{pu}$ 117 of the peer system 102 instead of the encryption public key $K_{pu}$ 113; peer system 102 then uses the corresponding signing private key $S_{pr}$ 119 to generate a certificate for its encryption public key $K_{pu}$ 113, without contacting the certificate authority 104. Both certificates are published in the clear, as previously described, in one or several files jointly referred to as the client key file 112. For the present embodiment, the validity of the encryption public key 113 is defined as the conjoint validity of both certificates (for keys 113 and 117, respectively), and verified accordingly per the certification verification process to be described later. Said method of self-certification of an encryption public key 113 by authority of a certified signing key pair $S_{pu}$ 117 and $S_{pr}$ 119 is used, in one embodiment, by peer system 102 to renew its encryption key pair $K_{pu}$ 113 and $K_{pr}$ 115, respectively, without having to request a new certificate from the certification authority.

In one embodiment, encryption private keys $K_{pu}$ 113 and $K_{pr}$ 115 are randomly generated. In another embodiment, the series of encryption private keys $K_{pu}$ 113 and $K_{pr}$ 115 used by peer system 102 are deterministically generated from a random seed, such as, in one embodiment, per the process described later when generation of the encryption private key for a group under a preferred embodiment is described. In one embodiment, the random seed is securely provided to the registry and certification authority server 104 or other trusted authority during initial registration, for the purpose of keeping all past, present and future encryption private keys $K_{pu}$ 113 and $K_{pr}$ 115 of peer system 102 in escrow, or, in a roaming solution, for allowing a user to reconstruct his current encryption private key $K_{pr}$ 115 from a remote location.

Publication of Resources and Resource Key Files

Publication by peer systems 102 of a resource 114 to be controlled via the distributed access control of the present invention includes the companion publication of the associated resource key file (RKF) 116, to provide the authorized peer systems 102 with the necessary resource key 120 to recover the published resource 114. In accordance with the present invention, when requested, a published resource 114, is made available to the requesting peer system 102 in an encrypted form; more specifically, the published resource 114 is encrypted using its resource key 120. Publication of the corresponding RKF 116 in and of itself is accomplished in a conventional manner (i.e. without access control); in one embodiment, this is accomplished by notifying an assigned resource naming and locator server 106.

Figure 5:
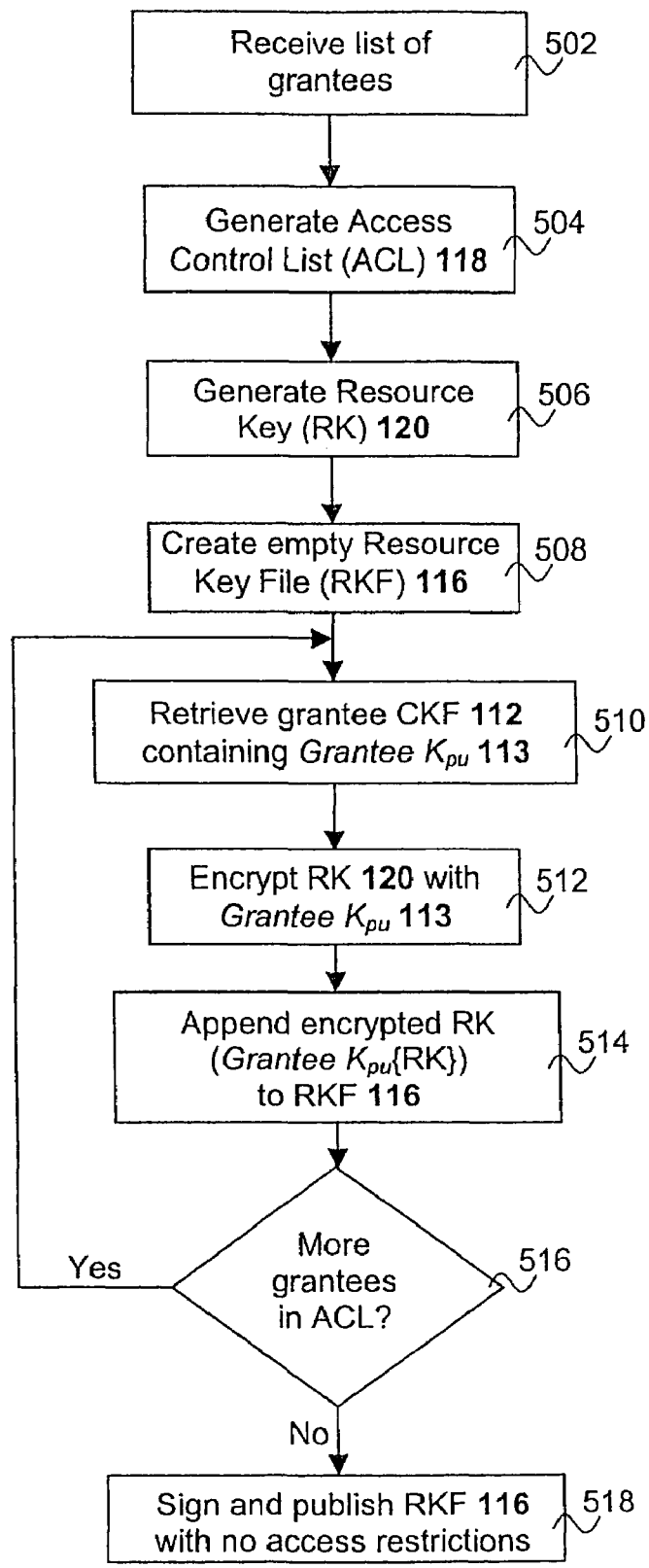
FIG. 5 illustrates the resource publication operation flow of a publisher peer system for generating and publishing a resource key file for a resource to be published with distributed access control under the present invention, in accordance with one embodiment.

FIG. 5 illustrates the operational flow of the relevant aspects of CAC client 110 (more specifically, client key generation and publication (CKGP) function 134) for generating and publishing a RKF 116 for a resource 114 to be published with distributed access control, in accordance with one embodiment. As illustrated in block 502, CAC client 110 (CKGP function 134) first receives the list of identifications of peer systems 102 to be granted access to the resource 114 to be published. This list can be made available by a user of the publisher peer system 102 through a conventional user interface, or by supplying CAC client 110 with a comma separated value (CSV) or XML-encoded file enumerating the "grantees".

Next, in block 504, CAC client 110 (CKGP function 134) generates an access control list (ACL) 118 for the resource 114 to be published with distributed access control, enumerating the grantees, i.e. peer systems 102 to be granted access to the resource 114 to be published with distributed access control.

Next, for the embodiment, in block 506, CAC client 110 (CKGP function 134) generates a resource key 120 to be used to encrypt the resource for distribution. In one embodiment, the resource key 120 is randomly generated, intended for use in conjunction with a symmetric cipher. An example of a symmetric cipher is the Rijndael (a.k.a. AES) cipher known in the art.

Next, in block 508, upon generating resource key 120 for the resource 114 to be published with distributed access control, CAC client 110 (CKGP function 134) initializes an empty RKF 116 for the resource to be published with distributed access control. Then, in blocks 510-516, CAC client 110 (CKGP function 134) iteratively creates the contents of the RKF 116 for the resource to be published with distributed access control.

For the embodiment, in block 510, for each grantee 102 in the ACL 118, CAC client 110 (CKGP function 134) accesses and retrieves from the grantee's published client key file 112, the grantee's certificate for the grantee's encryption public key Grantee $K_{pu}$ 113, verifies the certificate in a conventional manner known in the art, and extracts encryption public key Grantee $K_{pu}$ 113. In block 512, upon successful authentication and extraction of the encryption public key Grantee $K_{pu}$ 113, CAC client 110 (CKGP function 134) generates an encrypted entry of the resource key 120, encrypting the resource key 120 using the retrieved Grantee $K_{pu}$ 113 of the grantee 102. In block 514, upon generation of the encrypted resource key, CAC client 110 (CKGP function 134) places the generated entry in the RKF 116.

Operations 510-514 are repeated for each grantee, until it is eventually determined, at block 516, that an encrypted entry of the resource key 120 of the resource has been generated and placed into RKF 116 for each peer system 102 to be granted access to the resource to be published.

Thereafter, in block 518, for the embodiment, CAC client 110 (CKGP function 134) signs and publishes the RKF 116. RKF 116 may be signed employing any signature technique known in the art. As described earlier, publication of the RKF 116 is accomplished in a conventional manner without access control, i.e. by notifying its name and version to an appropriate resource naming and locator server 106.

In one embodiment, a publishing peer system 102 of a resource 114 whose access is to be controlled via the distributed access control of the present invention will locally store the published resource 114 in plaintext form on publisher 102. That is, encryption of the published resource 114 is performed only when a copy of the resource is provided to a requesting peer system 102 in response to its request. In alternate embodiments, of course, a publisher peer system 102 may locally maintain a published resource 114 in encrypted form, i.e. by pre-encrypting all published resources.

Note that in the preferred embodiment of the present invention, no check is preformed on a requestor for a resource as to whether the requestor is an authorized peer system 102. Denial of access to the contents of published resource 114, in the event the requesting peer system 102 is not an authorized peer system, relies on the fact that an unauthorized peer system will not be able to recover the required resource key 120 necessary to recover the content of the resource 114 of interest, and therefore will not be able to recover and access the content of the resource 114.

In preferred embodiments, a directory or sub-directory resource is published in the form of a regular file, called a Directory Listing, containing the meta-data describing the content of the directory or sub-directory. Directory Listings are published using the same publication, encryption, and access control mechanisms as other resources.

Accessing Published Resources with Access Control

Figure 6:
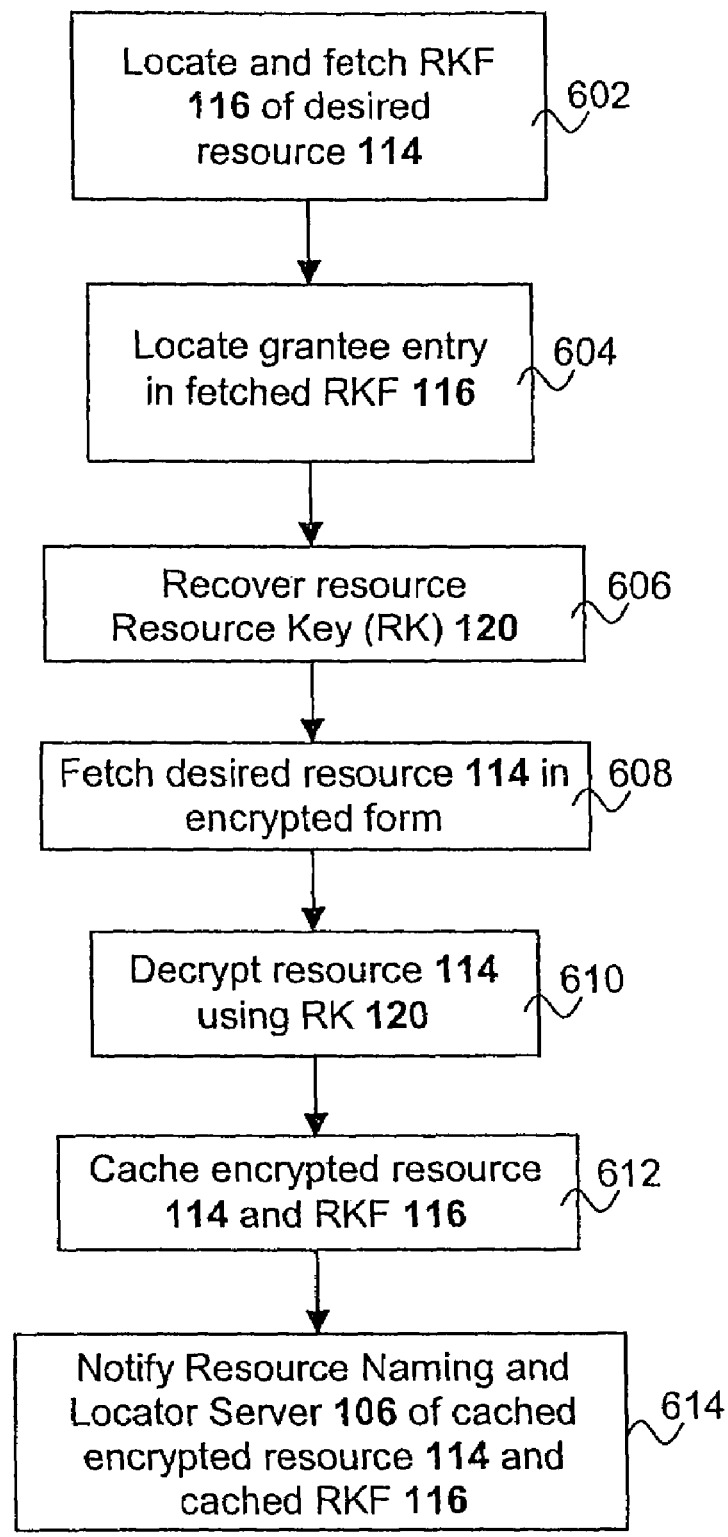
FIG. 6 illustrates the resource access operation flow of a consumer peer system for accessing published resources with distributed access control under the present invention, in accordance with one embodiment.

FIG. 6 illustrates the operational flow of the relevant aspects of CAC client 110 for accessing a published resource 114 with distributed access control, in accordance with one embodiment of the present invention. As illustrated, for the embodiment, upon instructed to facilitate retrieval of a published resource 114, more specifically, having been informed by a resource naming and locator server 106 of the location of a resource of interest 114 and the location of the corresponding resource key file (RKF) 116, CAC client 110 (more specifically, resource publishing and access (RPA) function 136) first fetches the RKF 116 of the resource 114 of interest from the original publisher of the resource or one of its cachers, block 602.

Then, in block 604, CAC client 110 (RPA function 136) locates its entry of the encrypted resource key (RK) 120 in the retrieved RKF 116. In one embodiment, the intended beneficiary, i.e. the identity of the intended grantee, of each encrypted resource key entry in RKF 116 is identified with the name of the intended beneficiary peer system 102. In alternate embodiments, the encrypted resource key entries in RKF 116 are not identified, and the intended beneficiary or grantee may be determined on a trial and error basis.

For the embodiment, in block 606, CAC client 110 (RPA function 136), using its corresponding encryption private key $K_{pr}$ 115, proceeds to decrypt its entry to recover the resource key RK 120.

Continuing to refer to FIG. 6, upon recovering the resource key 120, CAC client 110 (RPA function 136) then proceeds, in block 608, to retrieve a copy of the resource of interest 114, in encrypted form, from its original publisher or one of its cachers. Upon obtaining the resource of interest 114 in an encrypted form, CAC client 110 (RPA function 136) proceeds, in block 610, to recover its content by decrypting the encrypted copy using the recovered resource key 120.

For the embodiment, assuming the consumer peer system 102 is interested in becoming a cacher of the resource of interest 114, CAC client 110 (RPA function 136) causes a copy of the resource 114 in encrypted form and the corresponding RKF 116 to be cached locally. As described earlier for conventional publication of resources, in like manner, CAC client 110 (RPA function 136) notifies an assigned resource naming and locator server 106 of the existence of the cached copies of the encrypted resource 114 and the RKF 116.

In one embodiment, unlike the original publisher of the resource of interest, the resource is cached by the cacher grantee peer system 102 in the encrypted form.

Advanced Features

Having described the basic features of the present invention, we now turn to describe the advanced features of the present invention in turn, including but not limited to the features of group grantees, password protected publications, obfuscated publications, resource key file inheritance, accesses via gateways, write or execute accesses, secured resource search, and so forth.

Group Grantees

Figure 8:
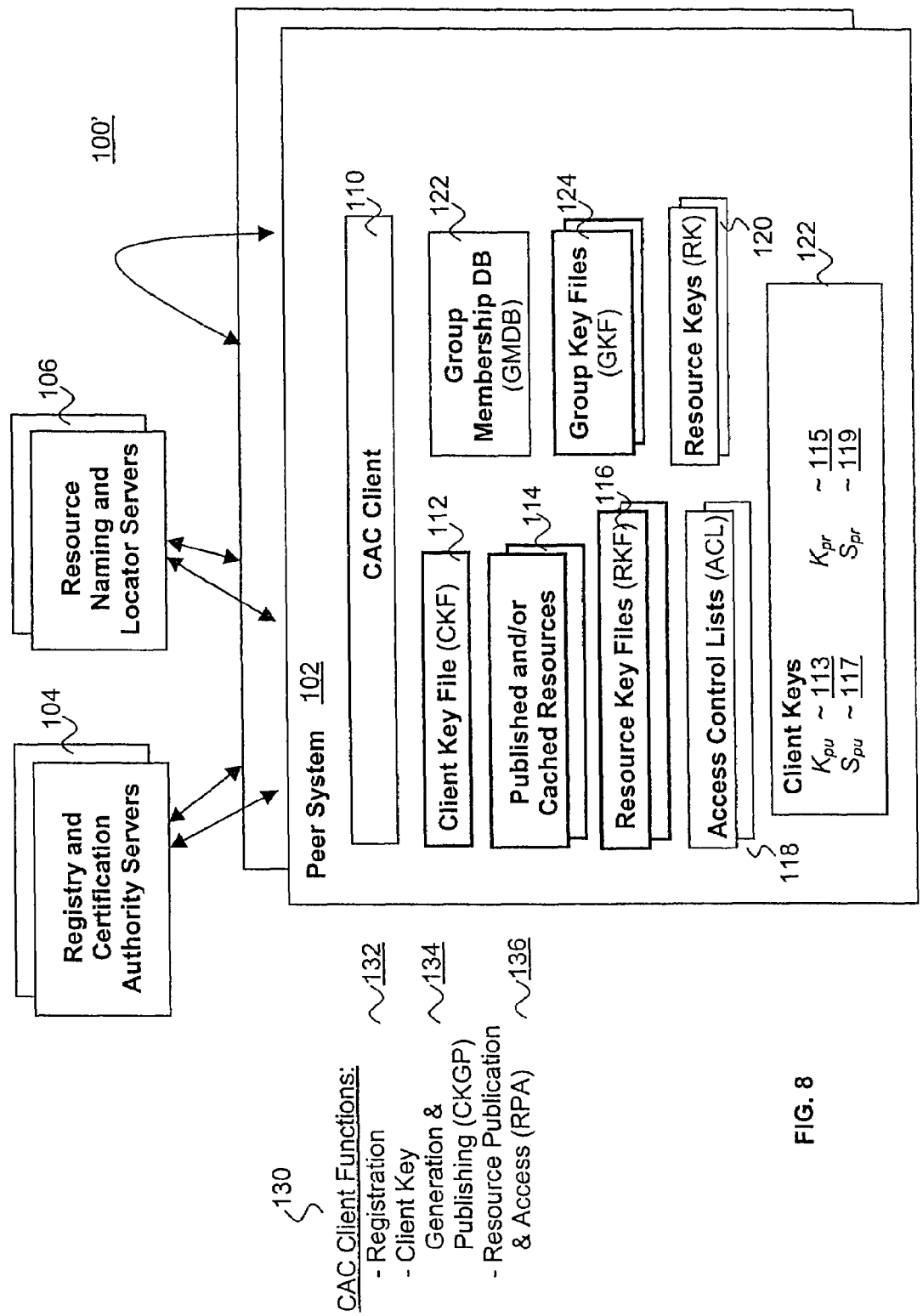
FIG. 8 illustrates another embodiment of the present invention, wherein access of the published resources may be authorized to groups, where the ultimate potential consumer peer systems are members of the authorized groups.

As alluded to earlier, in various embodiments, authorizations may be given to a group of which the ultimate peer systems 102 are members, as opposed to the individual peer systems 102 as described thus far. FIG. 8 illustrates one such embodiment. As shown, in addition to the earlier described elements, for embodiments including support for granting authorizations to grantees through their affiliations or membership in groups, peer systems 102 also include group membership database (GMDB) 122 and group key files (GKF) 124.

Figure 9:
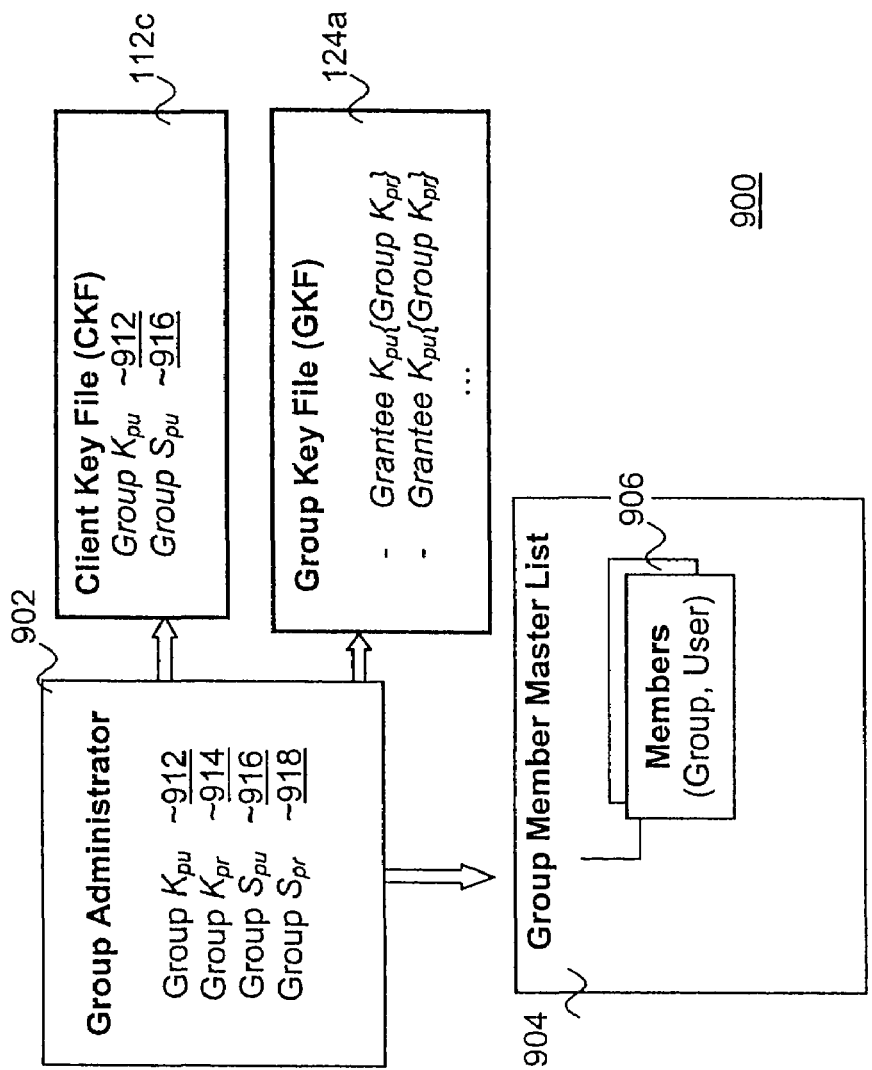
FIG. 9 illustrates the concept of groups, group membership files, and group key files of the present invention, in accordance with one embodiment.

FIG. 9 illustrates group creation in further detail, including the creation of group membership lists and group key files, in accordance with one embodiment. As illustrated, to facilitate the group grantee feature of the present invention, for a group 900, a group administrator 902, which may be any one of a publisher or consumer peer system 102, or a dedicated peer system 102 acting as the group administrator, keeps track of the Group Member Master List 904 that includes all Members 906 of the group 900, where a member 906 may be an individual peer system 102 or another group 900. The group administrator 902 first generates an encryption public and private group key pair for the group 900, Group $K_{pu}$ 912 and Group $K_{pr}$ 914, respectively. The group administrator 902 next creates a group key file (GKF) 124 that includes entries of the group's encryption private key Group $K_{pr}$ 914, correspondingly encrypted for every member 906 of the group 900. The encryption group private key Group $K_{pr}$ 914 is encrypted using the corresponding encryption public keys Grantee $K_{pu}$ 113 of the group members 906 (which may e.g. be retrieved from the members' published client key files 112). Group administrator 902 also publishes its own encryption public key Group $K_{pu}$ 912 in a CKF 112 for use by publisher peer systems 102 similar to the way other potential consumer peer systems 102 publish their encryption public keys 113 in client key files 112.

Note that as illustrated, members 906 of a group 900 may themselves be individual peer systems 102 or groups 900. No restriction is placed on group nesting; in particular, groups may circularly include each other without adversely affecting the system. In particular, a group 900 may also have only one member 906, or multiple personifications of one member, both referred as a "singleton" group. The latter application of "singleton" group is particularly useful in streamlining access granting to a user, while allowing the user to have a continually changing portfolio of peer systems 102.

Determining Authorization for Group Grantees

Figure 10A:
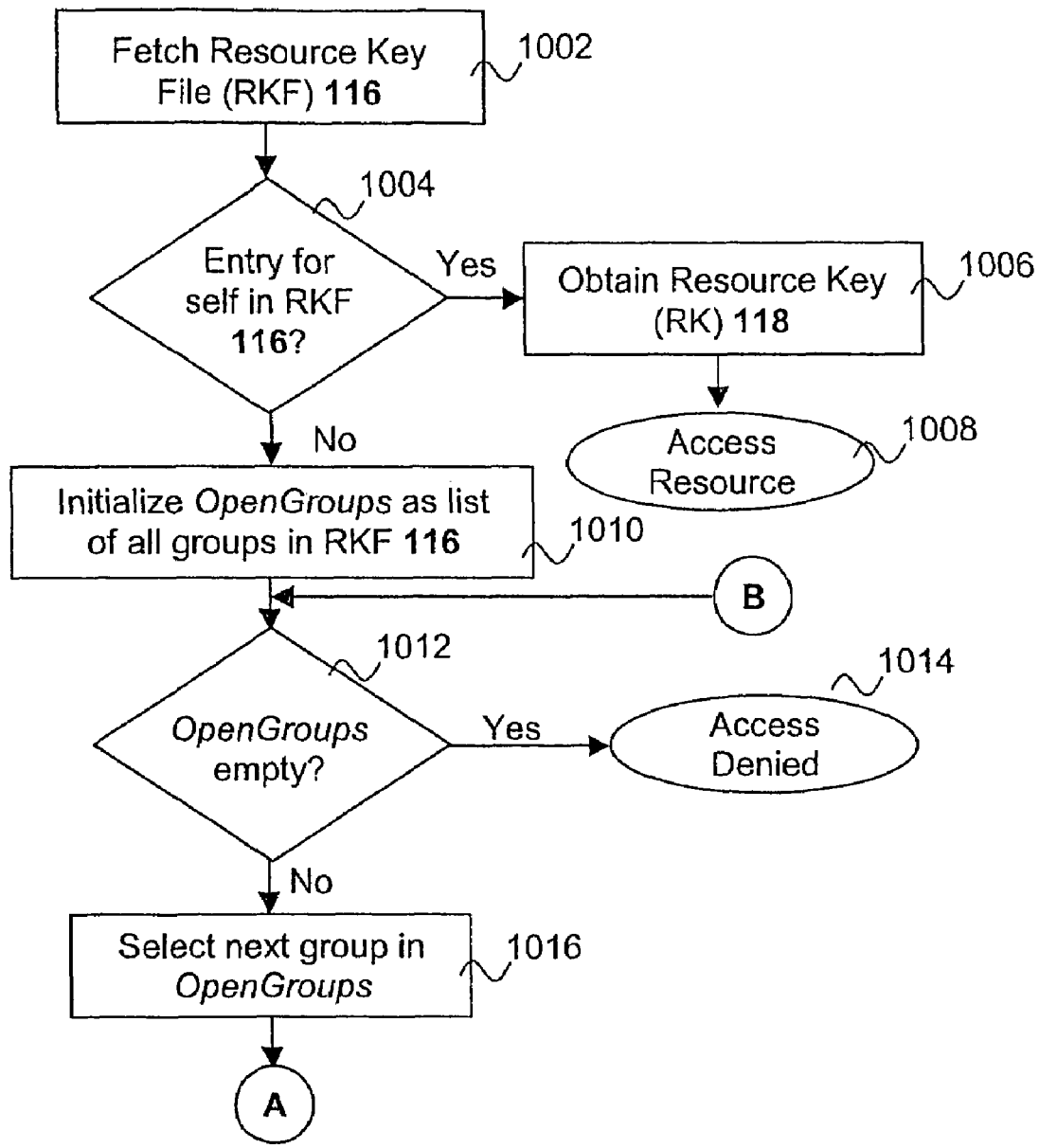
FIGS. 10a-10b illustrate the operational flow for recovering a group encryption private key by a consumer peer system under the present invention, in accordance with one embodiment.
Figure 10B:
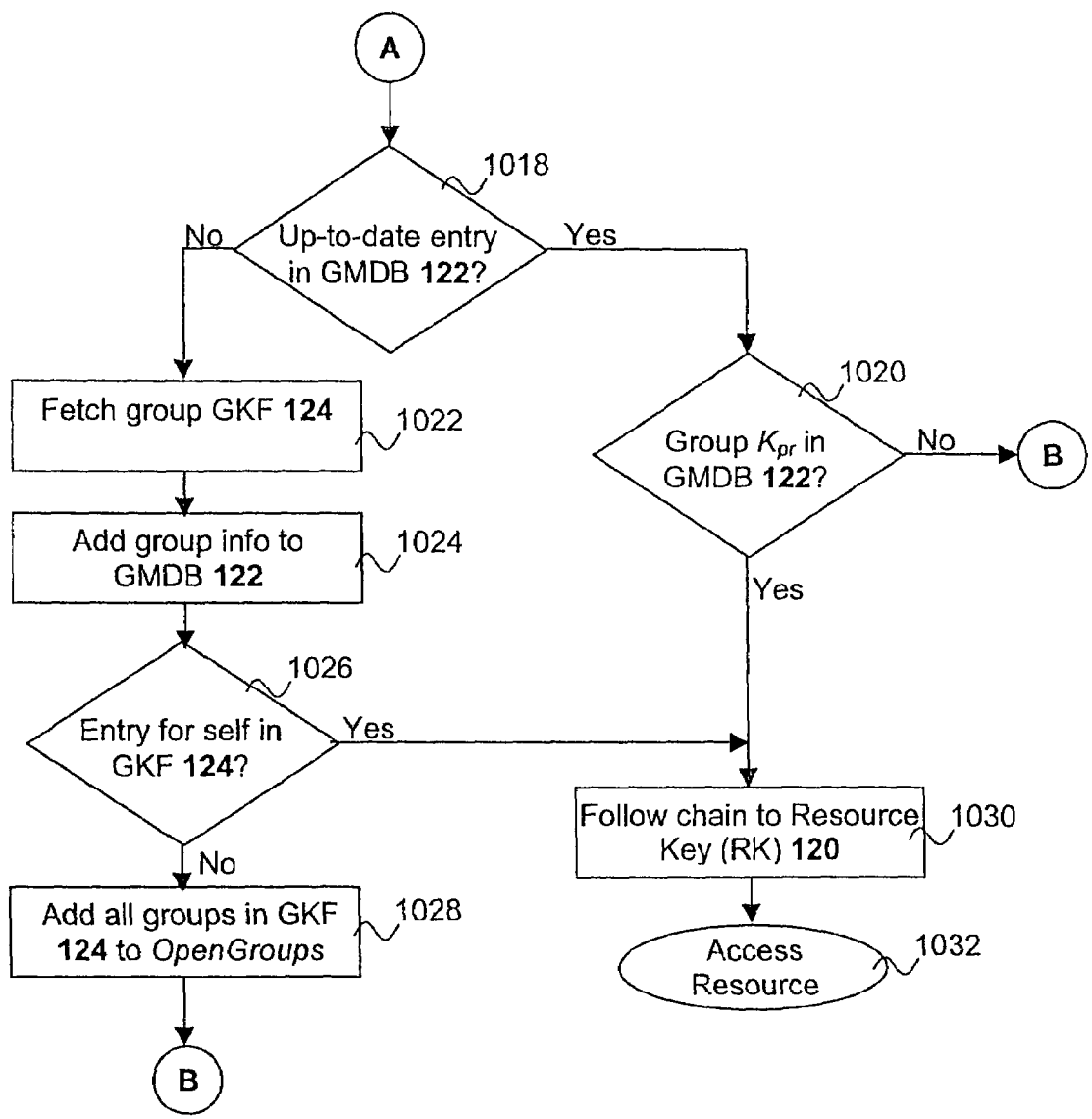

FIGS. 10a-10b illustrate the operational flow of the relevant aspects of CAC client 110 (more specifically, RPA function 136) for accessing a published resource 114 in an embodiment supporting granting resource access authorization through membership in groups. The operation is set to determine a path of group membership and corresponding group private keys from the CAC client 110 to at least one group accessor listed in the retrieved RKF 116 for resource 114. For the embodiment, the operation implements a "breadth first search" procedure as known in the art, augmented with a local database of visited group memberships, the Group Membership Database (GMDB) 122, maintained by the CAC client 110 for caching and loop breaking purposes.

As illustrated, for the embodiment, when processing a RKF 116, block 1002, CAC client 110 (RPA function 136) first checks to see if said RKF 116 contains an entry for this peer system 102, block 1004. If such an entry is found, the resource key (RK) 118 for the resource is retrieved from the RKF 116, block 1006, as previously described under "Accessing Published Resources with Access Control", and the published resource 114 can be decrypted using the RK 118, block 1008.

If the RKF 116 does not contain an entry for CAC client 110, the CAC client 110 (RPA function 136) performs an exploration of the group structure with the goal of finding a group of which it is a member and which is either listed in RKF 116 or for which a chain of groups exists such that by following the chain one can find a group listed in RKF 116. In a preferred embodiment, this exploration is performed using a breadth-first approach well known to those skilled in the art.

The CAC client 110 (RPA function 136) starts by initializing OpenGroups, the list of all groups that have not yet been explored, to the list of groups listed in RKF 116, block 1010. The CAC client 110 (RPA function 136) then repeats the following actions 1012-1028, until either a chain of groups is found, or OpenGroups becomes empty, blocks 1012 and 1014. In the latter case, the CAC client 110 (RPA function 136) concludes, in block 1014, that it has not been granted access to published resource 114.

In block 1016, the next group on OpenGroups is selected for exploration and removed from OpenGroups. At block 1018, CAC client 110 (RPA function 136) tests whether an up-to-date entry for this group already exists in its GMDB 122. If such an entry is found, execution of the algorithm proceeds at block 1020, where the client checks whether the entry in GMDB 122 also contains the group private key Group $K_{pr}$ 914. If the group private key 914 is not found in the GMDB 122, execution continues back at block 1012.

If the group private key Group $K_{pr}$ 914 is found in GMDB 122 at block 1020, execution of the algorithm continues at block 1030, where the information in the GMDB 122 is used to follow a chain of groups leading to a group listed in the RKF 116 of published resource 114; for each element in the chain, the group private key 914 of the previous element (i.e. group) in the chain is used to recover the group private key 914 of the current element (i.e. group) in the chain, ultimately leading to the retrieval of the resource key 120 and enabling the decryption of the published resource 114, block 1032, as in the earlier described operation of 606 of FIG. 6. As the group private keys 914 are uncovered in the process described above, the GMDB 122 is also updated to cache these group private keys 914 for future executions of the algorithm in FIGS. 10a-10b.

Back at block 1018, if no valid entry is found in the GMDB 122, the GKF 124 for this group is fetched by CAC client 110 (RPA function 136), block 1022. Next, at block 1024, the group information is added as a new entry to the GMDB 122. In one embodiment, the new GMDB entry is formulated by combining the following information: the group name; a checksum or hash of the fetched GKF 124; the timestamp of the GKF 124; the group private key 914, which is left empty at this point.

At block 1026, the fetched GKF 124 is examined to determine whether it contains an entry for CAC client 110. If such an entry is found, execution continues at block 1030, and the published resource 114 can be accessed.

If at block 1026, no entry for CAC client 110 is found in the retrieved GKF 124, all the groups in GKF 124 are added to OpenGroups for further exploration, block 1028, and execution continues back at block 1012.

Accordingly, authorization may also be indirectly granted to peer systems 102 by authorizing groups to which the ultimate beneficiary peer systems 102 are members.

Efficient Updating of Resource Keys and Group Key Pairs

In one embodiment, resource keys 120 and group key pairs 912 and 914 are randomly generated, upon the original publication of a resource 114 or group 900, and every time the access control list 118 for the resource 114, or the group member master list 904 for group 900, change, respectively. However, in a preferred embodiment, these keys are generated using the deterministic process described below. This key chaining approach allows CAC clients 110 (more specifically, client key generation and publishing function 134) to advantageously use the caching of resources on peer systems 102, without having to re-publish a resource 114 each time its resource key 120 changes, and without having to re-publish a group key file 124 each time the group key pair 912 and 914 of one of its grantee groups 900 changes.

In the preferred key chaining approach, resource keys 120 are generated in a deterministic manner from a random "seed" associated with the RKF 116 and kept secret by the publishing peer system 102, in such a way that old keys may be easily derived from newer ones, but not the other way around. An example of such approach to generating the resource key is described below, when generation of the encryption private key for a group under a preferred embodiment is described; said generation method as described applies to the generation of private keys of an asymmetric cipher, but may also be practiced for generating the keys of a symmetric cipher. In a preferred embodiment, this approach is used in conjunction with frequent scheduled renewal of resource keys 120 as published in RKFs 116, combined with asynchronous re-encryption of resources.

In the preferred key chaining embodiment, the public/private key pair 912 and 914 of a group 900 is constructed in a deterministic manner (as opposed to being generated randomly). More specifically, a scheme is used wherein knowledge of the current group private key Group $K_{pr}$ 914 allows easy derivation of all previous group private keys 914 for the group 900. The scheme advantageously allows the keys to be changed frequently (e.g. to effect group membership revocation), without requiring either the group 900 or its member clients 906 to store any of the old keys.

More specifically, in one embodiment, group administrator 902 generates its keys in the following deterministic manner:

a) Group administrator 902 first generates and saves a secret random "seed", along with an index number N. The initial value of the index N is configurable, but is typically chosen to be a large number, such as one million, to allow for a long period of operation according to the manner described herein. The index N is then decreased by one every time a new encryption key pair Group $K_{pu}$ 912 and Group $K_{pr}$ 914 is generated for the group 900 under this scheme.

b) Group administrator 902 then repetitively applies a one-way function to the seed N times, for the current value of N, to obtain the initial group encryption private key Group $K_{pr}$ 914. The one-way function may be any one of such functions known in the art, e.g. MD5 or SHA-1.

c) Group administrator 902 then computes the corresponding group encryption public key Group $K_{pu}$ 912 in a conventional manner that is well-known to those skilled in the art.

In a preferred embodiment that uses ElGamal as the underlying public key cipher, the actual ElGamal private key is obtained from the group encryption private key Group $K_{pr}$ 914 by hashing Group $K_{pr}$ 914 to produce a bit string of the desired number of bits; from there, the ElGamal public key is easily derived using the methods known to those skilled in the art. In this embodiment, the group encryption public key Group $K_{pu}$ 912 is simply taken as the ElGamal public key.

d) Certification is then obtained for the group encryption public key Group $K_{pu}$ 912, either by asking a registry and certification authority server 104 to sign Group $K_{pu}$ 912, or by having the group administrator 902 signing and/or certifying its own encryption public key Group $K_{pu}$ 912, according to the method described earlier under "Registration and Initialization of Potential Consumer Peer Systems". The certified group encryption public key Group $K_{pu}$ 912 is published, along with the index N used to generate it, in a CKF 112 as earlier described for an individual potential consumer peer system 102.

e) Next, an initial empty GKF 124 is also created and published by group administrator 902.

f) Thereafter, as peer systems 102 or groups 900 are individually admitted or added as members 906 of the group 900, identification of each member peer system 102 or group 900 is added by the group administrator 902 to the group's master member list 904. Further, the CKF 112 of the member peer system 102 or group 900 is accessed, and its encryption public key Grantee $K_{pu}$ 113 is retrieved and verified. Upon verification, the current encryption private key of the group, Group $K_{pr}$ 914, is encrypted using the member's encryption public key Grantee $K_{pu}$ 113, and the encrypted entry is added to the GKF 124 of the group.

In one embodiment, the key publication portion of operation (f) is repeated periodically to ensure that the group's encryption private key Group $K_{pr}$ 914 is published with the latest, i.e. most current encryption public key Grantee $K_{pu}$ 113 of its members, should the latter change. In alternate embodiments, group administrator 902 may also subscribe, e.g. with a resource locator server 106, to be notified of any re-publication of the CKFs 112 of its member peer systems 102 or groups 900, and repeat its private key publication operation for a member 906 only upon having been notified of changes to the member's encryption public key Grantee $K_{pu}$ 113.

In one embodiment, when a member 906 is removed from the group 900, group administrator 902 decrements N by one, and a new group encryption private key Group $K_{pr}$ 914 is generated as earlier described, i.e. with the known one way function applied to the saved seed N times. The corresponding group encryption public key Group $K_{pu}$ 912 is re-computed, re-certified, and re-published. Then, the new group encryption private key Group $K_{pr}$ 914 is "re-published" for the remaining members 906, i.e. the corresponding entries in the group's. GKF 124 are replaced with new encrypted entries of the group's new encryption private key Group $K_{pr}$ 914 generated as earlier described.

The group encryption key computation scheme above ensures that a group member 906, having access to a GKF 124 containing the most recent group encryption private key Group $K_{pr}$ 914, can use it to derive any older group encryption private keys Group $K_{pr}$ 914, as may be needed to decrypt RKF entries previously published with those keys. In particular, this technique saves the CAC client 110 from regenerating and republishing RKFs 116 every time a group client listed as grantee to the resource 114 and for which there is an entry in the RKF 116 changes and republishes its encryption public key. The resulting savings are very significant, as the number of RKFs in the system can be potentially very large.

In one embodiment, step (b) above, comprising the repeated application of a one-way function N times and the corresponding derivation of the encryption private key Group $K_{pr}$ 914, are replaced by the following more efficient method. This method assumes that the initial value of N chosen in step (a) is the product of a number m of constant factors $B_1, \ldots, B_m$. For simplicity, the foregoing exposition assumes that m=2; the method is easily generalized for any number m:

(b1) Group administrator 902 determines the two unique numbers $N_1, N_2$, such that $N=N_1*B_1+N_2$.

(b2) Group administrator 902 repetitively applies a one-way function $F_1$ to the seed value $(N_1+1)$ times. The result is denoted $K_1$.

(b3) Group administrator 902 repetitively applies one-way function $F_1$ to the seed value $N_1$ times, then a different one-way function $F_2$ to the result $N_2$ times. The result is denoted $K_2$.

(b4) The group encryption private key Group $K_{pr}$ 914, to be "published" in the GKF 124, is then defined as the pair $K_1$ and $K_2$. (In one embodiment that uses ElGamal as the underlying public key cipher, the actual ElGamal private key is obtained by hashing the concatenation of $K_1$ and $K_2$ to produce a bit string of the desired number of bits, in accordance with the methods practiced in the art; from there, the public key Group $K_{pu}$ 912 is obtained as previously described.)

Referring to the above embodiment, those skilled in the art will appreciate that any group encryption private key Group $K_{pr}$ 914 of index N' can easily be derived from the private key Group $K_{pr}$ 914 of index N, by repeated applications of $F_1$ and/or $F_2$ to $K_1$ and/or $K_2$, provided that $N \leq N'$.

WebGate Access

Figure 11:
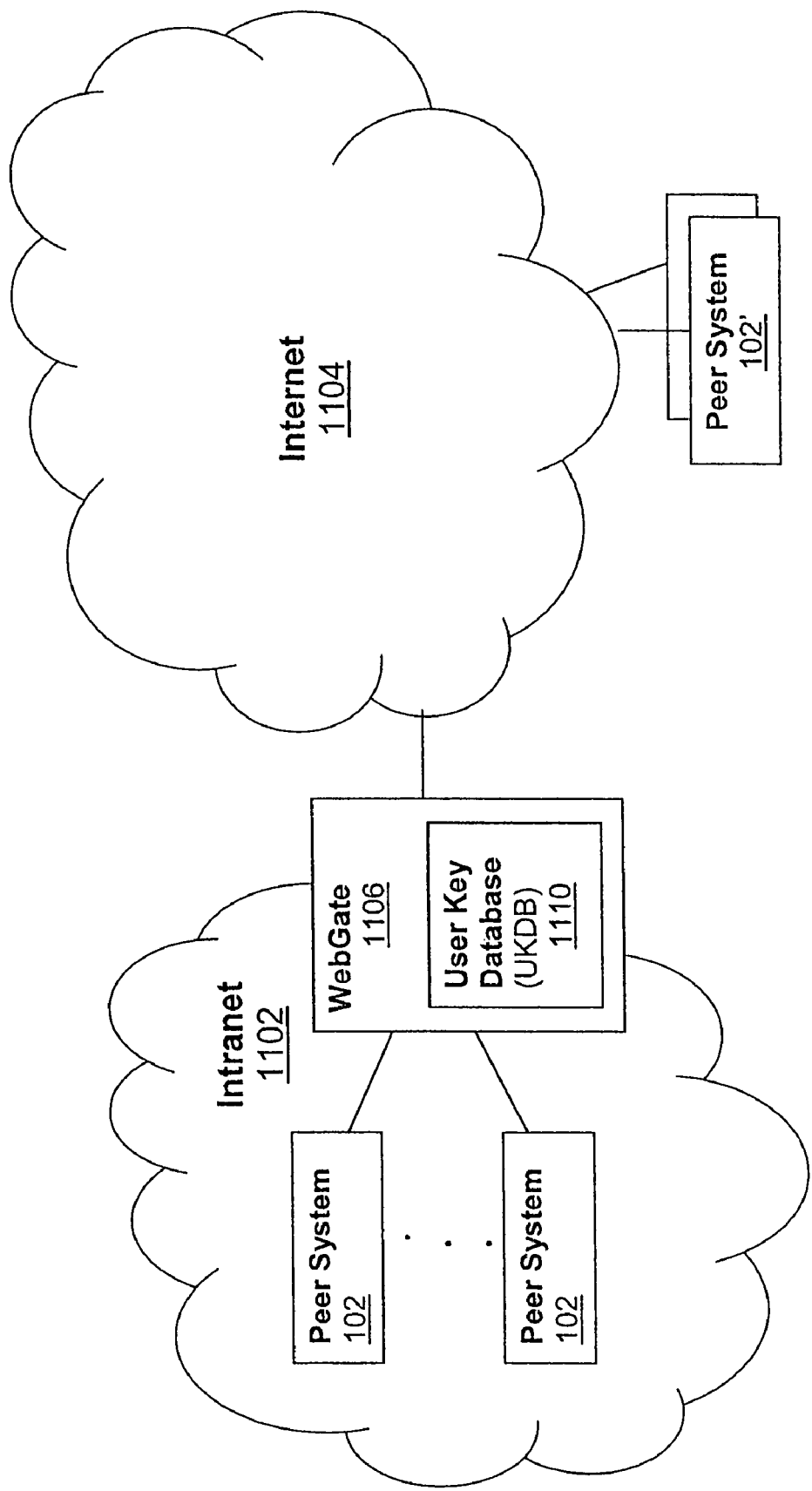
FIG. 11 illustrates the employment of gateway to facilitate an "outside" peer system in securely accessing a collection of "internally" published resources.

In various embodiments, support is provided to enable users of "outside" grantee peer systems, e.g. peer systems 102' outside of Intranet 1102 of FIG. 11, to access a collection of authorized "internally" published resources within the Intranet 1102. For a number of these embodiments, the support is provided, through a gateway, e.g. WebGate 1106 of FIG. 11, separating the Intranet 1102 and the Internet 1104, through which the "outside" peer systems 102' access Intranet 1102.

In one embodiment, the desired access is effectuated by having the resource key files 116 of the resources 114 to be accessible in this manner, to include entries encrypting the resource keys 120 of the resources 114 using a master "WebGate" encryption public key, thus enabling WebGate 1106 to be able to recover the resource keys 120 of the resources 114 and decrypt each of the published resources 114 of Intranet 1102 to be accessible in this manner for the "outside" peer systems 102'. In another embodiment, the ability for WebGate 1106 to decrypt each published resource 114 of Intranet 1102 to be accessible in this manner for the "outside" peer systems 102', is made possible by having the key pairs of the all peer systems 102' stored in a user key database (UKDB) 1110 accessible only to WebGate 1106.

For either embodiment, upon request by one such "outside" peer system 102', WebGate 1106 authenticates the requesting "outside" peer system 102'; this may be accomplished using any one of a number of known authentication techniques. Upon authenticating the requesting "outside" peer system 102', depending on the implementation, WebGate 1106 recovers the resource key 120 for the resource of interest 114, using its own key (the earlier described "master" WebGate key) or retrieving the requesting peer system's key pair from the UKDB 1110, and retrieves the resource of interest 114 (provided in encrypted form). Thereafter, WebGate 1106 decrypts the retrieved encrypted resource of interest 114 to recover the resource 114 for the requesting "outside" peer system 102', in a manner similar to the one described earlier under "Accessing Published Resources with Access Control" and "Determining Authorization for Group Grantees".

Write and Execute Accesses

In various embodiments, write and/or execute accesses of published resources 114, in addition to read accesses, are also supported. As those skilled in the art will appreciate, write access involves allowing a grantee peer system 102' to edit a published resource of interest 114 which the grantee peer system 102' is authorized to edit, whereas execute access involves a publisher peer system 102 executing a published resource of interest 114 (such as a Web service invocation) at the request of a grantee peer system 102'. One embodiment of these two kinds of support, write access and execute access, is illustrated in FIG. 12.

In various embodiments, write access of a published resource 114 is supported through the employment of the Hypertext Transfer Protocol (HTTP) or the Web-based Distributed Authoring and Versioning (WebDAV) protocol, designed for collaborative editing of web files. In alternate embodiments, other protocols/techniques may be employed instead.

For ease of understanding, the embodiment of will be described with the content owner or resource publisher peer system 102 being referred to as the Owner, and the grantee peer system 102' with write or execute access privilege being referred to as the Editor. The access privileges are granted by way of the RKFs 116 and the client keys 113-115 as earlier described. Further, the embodiment assumes that the Editor's write request is proxied by the Editor's CAC client 110.

Figure 12:
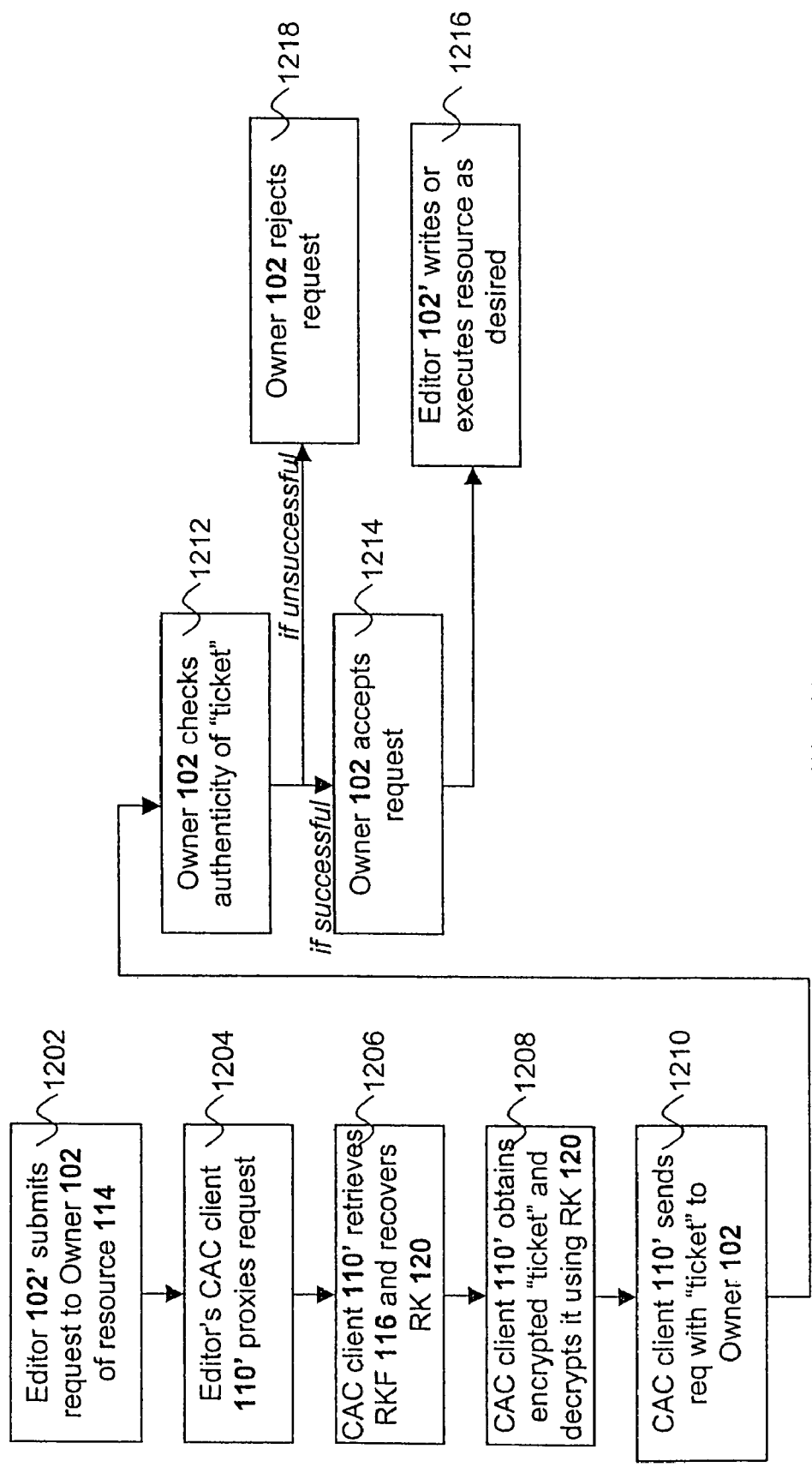
FIG. 12 illustrates the operational flow for writing or executing a published resource under the distributed cryptographic based access control of the present invention.

As illustrated in FIG. 12, an Editor 102' first submits a request destined for an Owner 102, to edit or execute a published resource of interest 114, block 1202. The request is intercepted by the Editor's CAC client 110', block 1204.

Upon interception, the Editor's CAC client 110' retrieves the resource key file 116 of the published resource of interest 114 (as described in "Basic Resource Publishing and Sharing without Access Control"), and recovers the resource key 120 of the resource 114, block 1206. Assuming success, the Editor's CAC client 110' also contacts the Owner 102 to obtain a digital permit, also known as a "ticket", which for the embodiment, is also encrypted by the Owner 102 using the same resource key 120; the CAC client 110' decrypts and recovers this "ticket" using the resource key 120, block 1208. Next, the Editor's CAC client 110' sends the actual write or execute request to the Owner 102, including the retrieved "ticket", block 1210.

Upon receipt, the Owner's CAC client 110 verifies the authenticity and/or validity of the "ticket", block 1212, and upon successful verification, accepts the request, block 1214. Resultantly, thereafter, the Editor 102' may write or execute the resource of interest 114 as desired, block 1216. For the embodiment, the request is rejected if the Owner's CAC client 110 is unsuccessful in verifying the authenticity and/or validity of the "ticket", block 1218.

Publishing with Passwords

In various embodiments, publishing of a resource 114 with access control based upon one or several passwords is also supported. The password or passwords, similar to the grantees, may be provided to the publisher peer system 102 through a user interface, or through a CSV or XML-encoded file enumerating the password/passwords.

For such embodiments, special entries, one per password, are added to the RKF 116 when it is generated (i.e. prior to operation 518 of FIG. 5). In one embodiment, each such entry will contain the resource key 120, encrypted one or several times using e.g. a symmetric cipher, with a salted hash of the password as key. In one embodiment, multiple encryptions are performed to increase the computing resources needed to brute-force the password. As those skilled in the art will appreciate, the salt hash is used to thwart parallel dictionary attacks against all passwords in the RKFs 116 or against many RKFs 116 at once. Further, the password protected entries are marked as such in the RKF 116 to differentiate them from the non-password protected entries.

When accessing such a published resource (i.e. with distributed access control and password protection), CAC client 110 (more specifically, resource publication and access (RPA) function 136), upon downloading the RKF 116, will attempt to find one non-password protected entry in RKF 116 that it can decrypt, as earlier described. If CAC client 110 fails, and one or more password-protected entries are present, CAC client 110 (RPA function 136) may choose to prompt a user of the peer system 102 for the password; in an alternate embodiment, CAC client 110 (RPA function 136) may use other means (e.g. a permissions configuration file) for obtaining the password. Upon having been provided with the password, CAC client 110 (RPA function 136) proceeds to attempt to decrypt all password-protected entries. If this attempt remains unsuccessful, the peer system 102 is not an authorized system for the published resource 114. If successful, CAC client 110 (RPA function 136) proceeds as earlier described to recover the resource key, and the content of the published resource 114 for consumption.

Obfuscated Publication

In the embodiments described thus far, a resource 114 is assumed to be published in its plain name, and served by a publishing or caching peer system 102 when said peer system is presented with a request for said plain resource name.

In alternate embodiments, for privacy reasons, a resource 114 may be published using an obfuscated (or encrypted) name. In these embodiments, the resource 114 will be served by a publishing or caching peer system 102 only upon presentation of a request containing the obfuscated name. Requests for the resource using the plain name are treated specially by peer system 102, as will be described below, without giving any indication regarding the existence of an actual resource of that name.

In one embodiment, the obfuscated name for a resource 114 is derived based on the plain name, in a manner that is reversible only by the publisher or owner of the resource. In one such embodiment, the obfuscated name for a resource 114 is obtained from the plain name of that same resource by encrypting the plain name using a symmetric cipher, using an obfuscation key generated and kept secret by the publisher 102. The same obfuscation key is used for all obfuscation operations by that publisher 102.

The obfuscated name is also encrypted using the resource key 120 and included in RKF 116 (e.g. before operation 518 of FIG. 5). For a grantee, in addition to recovering the resource key 120, CAC client 110 (RPA function 136) will also recover the obfuscated name of the published resource 114 as part of e.g. operation 606 of FIG. 6; operation 608 of FIG. 6 will be performed using this recovered obfuscated name of the resource 114.

In one embodiment, where publication under an obfuscated name is supported, when the resource 114 is requested under its plain name, the original publisher or a cacher peer system 102 returns the resource key file 116 instead. The practice thwarts accidental retrieval by unauthorized peer systems 102, or attacks by malicious systems making random requests. This is especially useful when used in conjunction with "Inheritance of RKFs" as described below, to conceal the content of entire directory trees to unauthorized peer systems.

In embodiments where obfuscated publication is supported, the published Directory Listing of a directory or sub-directory also provides a correspondence between the clear text name of each resource contained in the directory, and the obfuscated name under which the resource is published.

Inheritance of RKFs

Figure 7A:
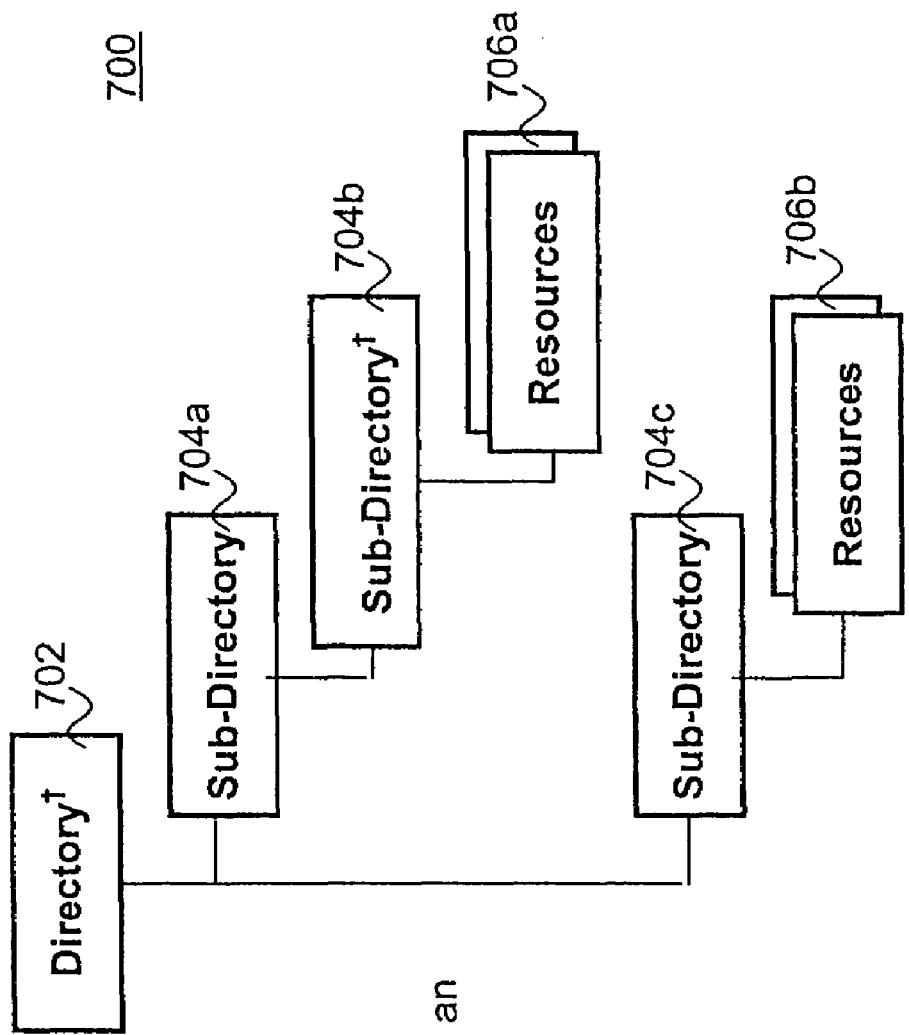
FIG. 7a illustrates an example directory structure having extended inheritable distributed access control of the present invention, in accordance with one embodiment.

In various embodiments, as illustrated by FIG. 7a, inheritance of an "ancestor" resource's RKF is also supported. That is, not every published resource 114 to be provided the distributed access control of the present invention has to have a directly associated RKF 116. The resource key 120 recovered for an ancestor directory or sub-directory resource (e.g. directory resource 702 in FIG. 7a) may be used to recover the descendant resources (e.g. resources 706b), unless a descendant resource has a direct associated RKF 116 (e.g. sub-directory resource 704b) or a RKF 116 associated with an intervening ancestor resource (e.g. resources 706a being subject to the RKF 116 associated with the ancestor resource 704b).

In embodiments where inheritance of RKFs is practiced, every published resource 114 to be accorded distributed access control in accordance with the teachings of the present invention must have either a directly associated RKF 116 or an ancestor directory or sub-directory resource 114 that has a direct associated RKF 116.

For example, as illustrated in FIG. 7a, directory structure 700 includes root directory 702, a number of sub-directories 704a-704c, and a number of leaf resources 706a-706b, such as non-executable data files and executable binaries. For the example, only exemplary root directory 702 and sub-directory 704b have directly associated RKFs 116. Thus, under the inheritance rules of these embodiments, accesses to resources 706a and sub-directory 704b are governed by RKF 116 directly associated with sub-directory 704b. Whereas accesses to resources 706b, sub-directories 704a and 704c as well as root directory 702 are governed by RKF 116 directly associated with root directory 702.

Thus, for embodiments where inheritance of RKFs is practiced, when retrieving an RKF 116 of a resource of interest 114, a grantee peer system 102 may necessarily traverse a directory structure, such as directory structure 700, upwards to locate the closest ancestor resource 114 having a RKF 116, and retrieve the RKF 116 of this ancestor resource. The retrieved RKF 116 of the ancestor resource 114 is then used for the (descendant) resource 114 of interest.

Inheritance of RKFs and Obfuscated Publication

In embodiments where inheritance of RKFs is supported in conjunction with obfuscated publication, after locating the closest RKF 116 associated to one of its ancestor resources, retrieval of a published resource 114 needs to additionally determine the obfuscated name of resource 114 since, as described earlier, only a request for this name will be honored by a publishing or caching peer system 102 of the resource.

Figure 7B:
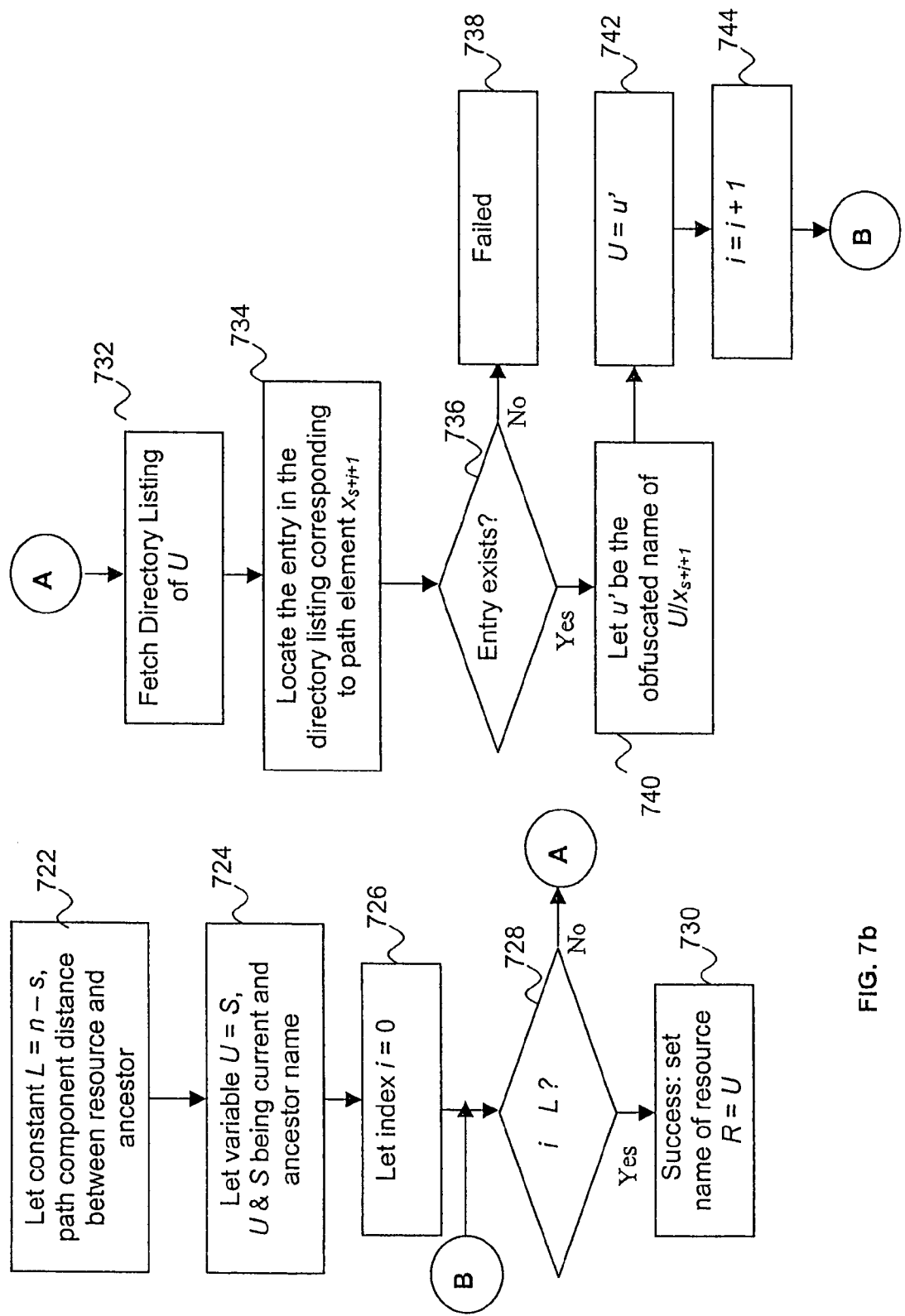
FIG. 7b illustrates the operational flow for recovering a resource published in an obfuscated manner where inheritable distributed access control is also supported, in accordance with one embodiment.

Retrieval of a published resource 114 may be accomplished in the following manner, illustrated in FIG. 7*b*:

a) Assuming that the clear text name of the resource of interest 114 is R, let $x_1, x_2, \ldots, x_n$ be the path components in the name path R.

b) Using the approach described previously, find the closest RKF 116 associated with an ancestor resource of R. Let the clear text name of this ancestor resource be S, and the path components in its name path be $x_1, x_2, \ldots, x_s$, where s n. Those skilled in the art will appreciate that the latter inequality holds by virtue of S being an ancestor of R.

c) Let the constant L=n−s, the number of levels CAC client 110 has to traverse "downwards" from S, the path of the enclosing RKF 116, to the path of R for the resource of interest 114; block 722.

d) Let variable U=S, the current obfuscated name of the resource. Let the index variable i=0; blocks 724 and 726.

e) If i L then stop, indicating success. The obfuscated name of R is U; blocks 728-730.

f) If i<L, assert that U corresponds to a directory.

g) Fetch the directory listing for U; block 732.

h) Locate the entry in the directory listing corresponding to path element $x_{s+i+1}$; block 734.

i) If no such entry exists, then stop, indicating failure; blocks 736-738.

j) Let u' be the obfuscated name of U/$x_{s+i+1}$, the concatenation of path U and element $x_{s+i+1}$, as indicated in the directory entry; block 740.

k) Replace U with u'; Increment i by 1; blocks 742-744.

l) Continue executing the algorithm at step e), i.e. at block 728 in FIG. 7*b*.

The obfuscated name u' in step (j) is obtained by a table lookup in the directory listing fetched in step (g), which, in a previously mentioned preferred embodiment, provides a mapping from the plain names of all the resources in the directory to the corresponding obfuscated names.

Publication of Signatures for Signed Published Content

In various embodiments, one or more of the published resources 114 may be signed, and publication of the signatures is supported. Signing of the published resources 114 and making the signatures available to the resource consuming peer systems 102 facilitates the resource consuming systems 102 in assuring the authenticity of the retrieved resources 114, including in the case where said resources 114 are retrieved not from their original publisher 102 but from a caching peer system 102.

In one embodiment, upon publication of a resource 114, CAC client 110 (more specifically, RPA function 136) automatically computes a time-stamped and versioned electronic signature for the resource 114 based on its plaintext, and using the signing key $S_{pr}$ 119 of the peer system 102. The signature is then made available to the consuming peer systems 102 as follows:

for a resource 114 that has a directly associated RKF 116, the signature is added to the RKF 116 of the resource 114;

for resources 114 having an inherited RKF 116, the signature is added next to the resource's entry in the directory listing of the parent directory of the resource 114.

In alternate embodiments, for efficiency reasons, ordinary non-keyed hashes (such as MD5 or SHA-1) may be substituted for signatures in either of the above cases. Recall that the resource key file 116 of a resource 114 may be signed as a whole with the publisher peer system's signature. Accordingly, as those skilled in the artr will appreciate, the hash will be authenticated. The substitution is also acceptable for Directory Listings with a directly associated RKF 116, since a Directory Listing as a whole may itself be validated by a hash in a signed resource key file 116, or for published directories with an inherited RKF 116, via a chain of hashes in ancestor Directory Listings, originating from a signed resource key file 116.

In alternate embodiments, the signature may be directly appended as meta-data to the encrypted resource itself.

Resource Searching with Access Permissions

In various embodiments, support is provided to enable a conventional search engine to operate under the present invention, in a manner that is efficient and preserves the access permissions to published resources when displaying search results.

In one embodiment, the secure crawling of published resources 114 is made possible by including with each resource key file 116 of a resource 114 that the search engine crawler is permitted to access, an entry of the resource key 120 encrypted using the encryption public key ("Crawler Key") of the search engine crawler. In various embodiments, a search engine crawler will thus be authorized to access almost all published resources, except for a minority of extremely sensitive resources 114.

In view of the general expectation that a search engine crawler be authorized to access virtually all published resources, accordingly the present invention advantageously exercises care to avoid having sensitive information be inadvertently revealed.

In various embodiments, this filtering of results, based on the access permissions of the peer system 102 performing the search, is achieved through "centralized search filtering". For this embodiment, a centralized search filter (not shown) is additionally provided. The centralized search filter is provided with access to the user's private decryption key $K_{pr}$ 115, e.g. as earlier described for a WebGate. The search results are filtered by the search filter, before they are returned to the user of a peer system 102.

In one embodiment, the centralized search filter operates as follows, shown in FIG. 13*a*:

1. A querying peer system 102 first authenticates itself with the search engine filter (SEF); block 1302. Any approach known to those skilled in the art may be used to authenticate querying peer system 102.

2. The SEF, upon successful authentication, obtains the peer system's keys (e.g. from the earlier described UKDB 1110), $K_{pu}$ 113 and $K_{pr}$ 115; block 1304.

3. The querying peer system 102 submits a query to the SEF; block 1306.

4. The SEF processes the query by passing it on to the search engine as a regular search engine query (i.e. without enforcing any access permissions), and internally obtains an ordered list of "hits"; block 1308.

5. The SEF then proceeds to examining the highest ranked hits, up to a predetermined number; block 1310. For each high rank hit examined:
   a) The SEF attempts to access the corresponding published resource 114, using the same method and the same peer system keys $K_{pu}$ 113 and $K_{pr}$ 115 as the CAC client 110 would, in a manner similar to accessing through the WebGate, described in "WebGate Access".
   b) If the access attempt was successful (i.e. the querying peer system 102 has access permissions to the hit), the hit is retained in the result list; otherwise it is discarded.

6. The resultant list is then presented to the querying peer system 102; block 1312.

In an alternate embodiment, filtering is not performed by a SEF that needs to have access to the keys $K_{pu}$ 113 and $K_{pr}$ 115 of the querying peer systems 102. Instead, access control is enforced by an Encryption Based Filter (EBF), in a manner similar to the one described above for resources, by encrypting each search hit with the resource key 120 of the hit resource (i.e. encryption based search filtering). More specifically, each link in the search result is separately encrypted with the same resource key 120 as the published resource 114 it links to, which the EBF retrieves by decrypting the appropriate resource key file 116 of the published resource 114. For the embodiment, the content of that resource key file 116 is returned in-line with the results—as opposed to the identification of the resource key file 116.

For the embodiment, the following additional precautions are also taken to reduce the possibility of information leakage:
   a) A variable number of "fake" hit/resource key file pairs are included in each search result, constructed to look just like genuine hit/resource key file pairs. These "fake" pairs are constructed pseudo-randomly so as to be reproducible from one query to the next.
   b) The search engine/filter always returns the user-requested number of hits, even if fewer actual hits are present. (The complement is faked as earlier described.)
   c) The recipient peer systems 102 or groups 900 listed in the resource key files 116 are scrambled by encrypting their names with their own public encryption keys $K_{pu}$ 113 or Group $K_{pu}$ 912 (along with some pseudo-random content). This ensures that only authorized peer systems or group members can recognize a valid resource key file 116 from a fake one.

Figures 13A, 13B:
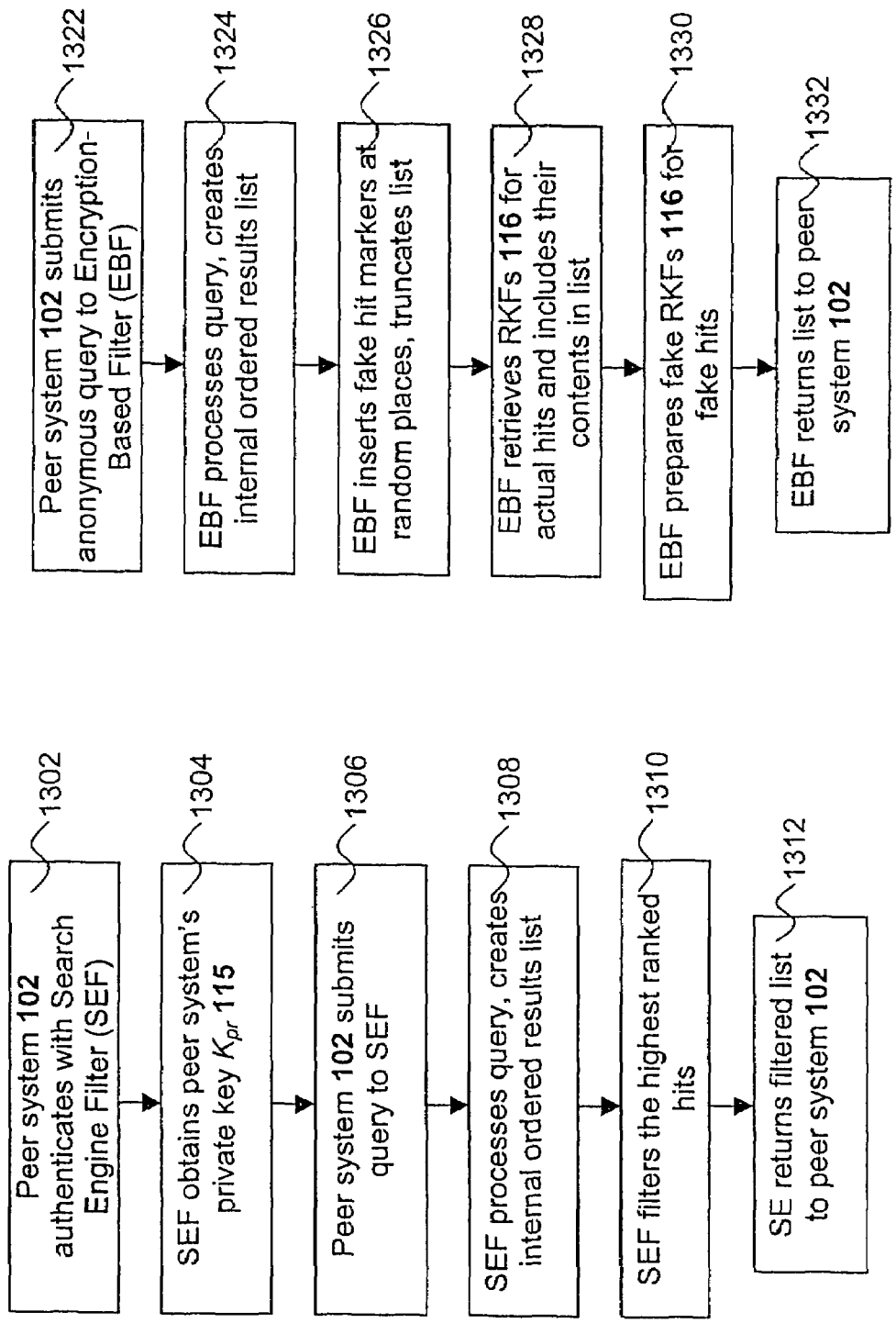
FIGS. 13a-13b illustrate the operational flow for filtering search results based on the access permissions of the users requesting the search, in accordance with two embodiments.

FIG. 13*b* illustrates the operation flow, in accordance with one embodiment. As illustrated:

1. A querying peer system 102 first anonymously submits a query to the Encryption-Based Filter (EBF), using its CAC client 110 (or the WebGate 1106); block 1322.

2. The EBF processes the query, by passing it on to the search engine as a regular search engine query (i.e. without enforcing any access permissions), and internally obtains an ordered list of "hits"; block 1324.

3. The EBF then inserts fake hit markers at random places in the hit list, after which the list in truncated to a fixed number of (genuine or fake) hits; block 1326.

4. For each genuine hit in the remaining internal list, the EBF retrieves the relevant resource key files 116 for the resource 114 corresponding to the hit, and prepares a result entry to comprise (i) the hit name encrypted with the resource key 120 found in the resource key file 116, (ii) the contents of the resource key file 116 itself, where all recipients have been scrambled as outlined above; block 1328.

5. For each fake hit marker in the internal list, the search engine/filter prepares a fake result entry of pseudo-random content and length; block 1330.

6. The ordered list of result entries is returned to the querying peer system's 102 CAC Client 110 (or the WebGate 1106); block 1332.

7. The CAC Client 110 on the querying peer system 102 then goes through each returned result entry and attempt to decrypt it using the enclosed RKF contents (based on the approach described in "Accessing Published Resources with Access Control"), returning the successfully decrypted entries to the querying peer 102.

In various embodiments, it may be desirable to make published resources 114 searchable by any peer system 102, even such peer systems that would not otherwise be granted access. For these embodiments, the universal searchability is facilitated through the provision of a search encryption public key ("Search Key"), as the similar key provided for a crawler ("Crawler Key"). The publisher of a resource 114 specifies for each resource key file 116 whether the Search Key should grant access to the controlled resources 114. Then, during the actual search, the search engine/filter (SEF) will retain such hits which are either accessible by the querying peer system 102 (as described above), or searchable by default (using the Search Key).

Note that the approach also enables anonymous searches, for which the querying peer system 102 is not required to log on. In this case, only hits that are searchable by default are returned.

Example Computer System

Figure 14:
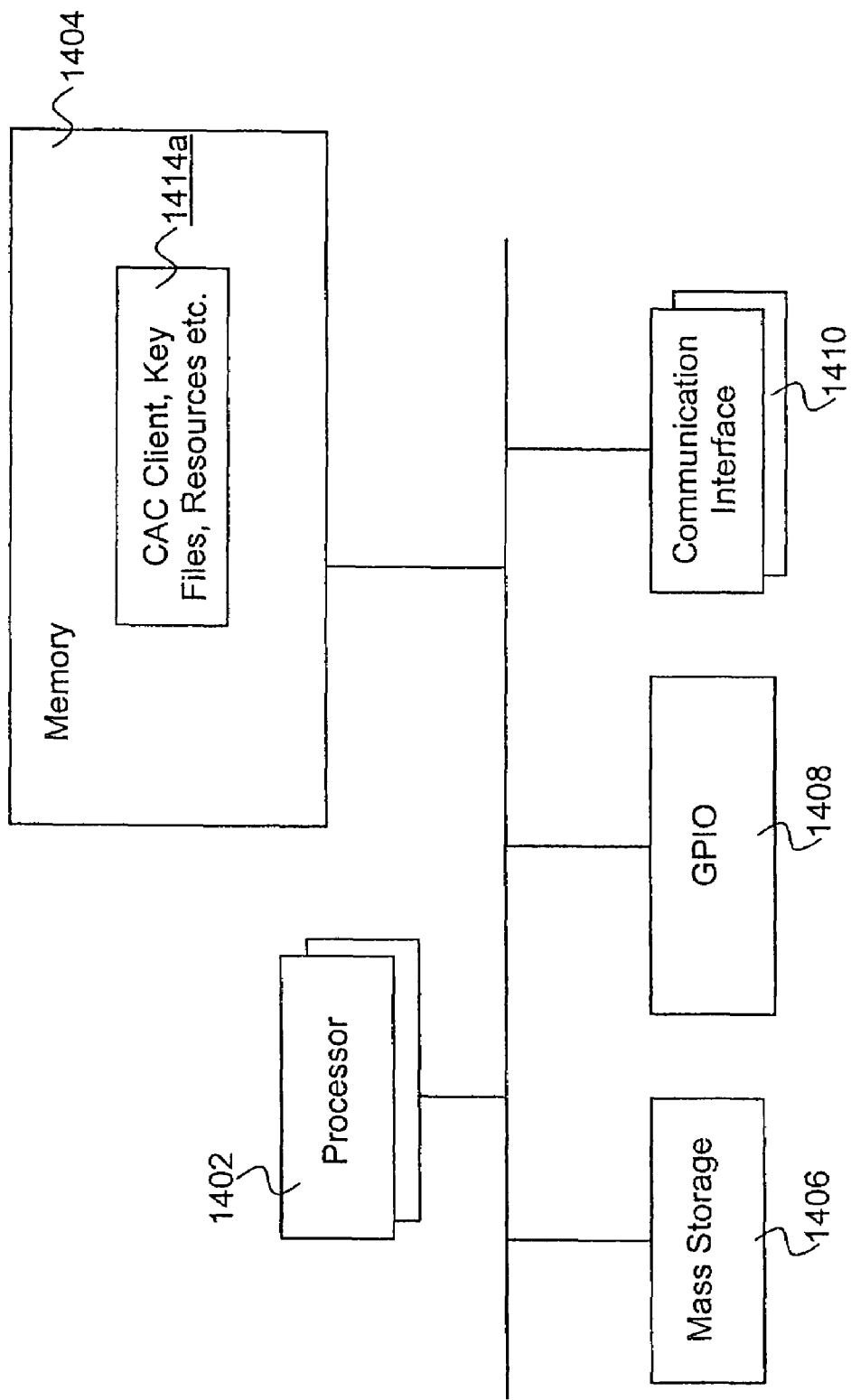
FIG. 14 illustrates an example computer system suitable for use as peer system to practice the present invention, in accordance with one embodiment.

FIG. 14 illustrates an exemplary computer system 1400 suitable for use as a peer computing device 102 of FIG. 1 to practice the present invention. As shown, computer system 1400 includes one or more processors 1402 and system memory 1404. Additionally, computer system 1400 includes one or more mass storage devices 1406 (such as diskette, hard drive, CDROM and so forth), general purpose input/output interfaces 1408 (for interfacing keyboard, cursor control devices and so forth), and communication interfaces 1410 (such as network interface cards, modems and so forth). The elements are coupled to each other via system bus 1412, which represents one or more buses. In the case of multiple buses, they are bridged by one or more bus bridges (not shown). Each of these elements performs its conventional functions known in the art. In particular, system memory 1404 and mass storage 1406 are employed to store a working copy and a permanent copy of the programming instructions implementing the teachings of the present invention (i.e. CAC client 110). The permanent copy of the programming instructions may be loaded into mass storage 1406 in the factory, or in the field, through a distribution medium (not shown) or through communication interface 1410 from a distribution server (not shown). The constitution of these elements 1402-1412 are known, and accordingly will not be further described.

Advantages

The advantages of the distributed, encryption-based access control methodology of the present invention include, but are not limited to:

The correctness and integrity of the underlying caching infrastructure need not be trusted, as it plays no role in the security properties of the model. For example, download requests for cached material may be granted without any check. Furthermore, the underlying caching infrastructure can deliver its full potential in terms of performance, since no security-related operations are performed when serving a cached resource.

In particular, the separation of access control and caching greatly simplifies the deployment of dedicated, unsecured cache servers in the underlying caching infrastructure, which proactively cache all published content to ensure round the clock availability.

The recipients of a resource, rather than the providers, do most of the work in "enforcing" access rights, which is deemed much fairer from a user experience perspective. Indeed, the extra load incurred on the user machine will be correlated to the user action of accessing remote resources, rather than unpredictably when resources are requested by other users.

The effort of tracing nested group memberships rests on the beneficiary of the transaction. Not only is this fairer, but it allows the beneficiary to cache the necessary access keys for future use.

Revocation of access rights and group membership is secure and easy. It is achieved transparently by updating the appropriate access keys, upon removal of group members or resource recipients.

In particular, this mechanism ensures that updated access rights are immediately in force for future publications, without the need for cumbersome on-line revocation servers.

Since all content is already encrypted for the purpose of access control, there is no need for secure communication channels between clients. This is especially important for dedicated cache servers, due to the prohibitive setup time of SSL connections.

Modifications and Alterations

While the present invention has been described referencing the illustrated and above enumerated embodiments, the present invention is not limited to these described embodiments. Numerous modification and alterations may be made, consistent with the scope of the present invention as set forth in the claims to follow.

Conclusion and Epilogue

Thus, a distributed and scalable method and apparatus for controlling access to published resources by peer systems in a distributed and scalable manner has been described. Since as illustrated earlier, the present invention may be practiced with modification and alteration within the spirit and scope of the appended claims, the description is to be regarded as illustrative, instead of being restrictive on the present invention.

What is claimed is:

1. A computer implemented method comprising:
  receiving a first resource identification of a first resource to be published, and first peer system identifications of a first plurality of peer systems within a peer-to-peer network to be granted access to said first resource after its publication;
  generating a first resource key for use to encrypt the first resource;
  obtaining a plurality of first encryption public keys of said first peer systems to be granted access to said first resource after its publication; such that an encryption public key is obtained from each of the first peer systems within the peer-to-peer network;
  generating a first resource key file for said first resource by:
    determining omitted peer systems within the peer-to-peer network by determining the first peer systems within the peer-to-peer network to be granted access to said resource after publication for which an entry within the resource file key has not been generated; and
    generating an entry for each of the omitted peer systems within the peer-to-peer network by individually including within the resource key file an entry associated with each of the omitted peer systems within the peer-to-peer network using a retrieved first encryption public key associated with each of the omitted peer systems; and
  publishing the first resource encrypted with said first resource key, along with said first resource key file, for selective access by said first plurality of peer systems such that a resource key file that includes a plurality of resource keys that are each individually associated with a peer system within a peer-to-peer network is published.

2. The method of claim 1, wherein said first peer system identifications of said first plurality of peer systems to be granted access to said first resource after its publication comprise a first peer system identification individually identifying a first of said first plurality of peer systems.

3. The method of claim 2, wherein said first of said first plurality of peer systems is a user peer system.

4. The method of claim 2, wherein said first of said first plurality of peer systems is a gateway separating an internal network and external networks.

5. The method of claim 2, wherein said first of said first plurality of peer systems comprises a search engine.

6. The method of claim 1, wherein said first peer system identifications of said first plurality of peer systems to be granted access to said first resource after its publication comprise a first group identification collectively identifying a first subset of said first plurality of peer systems.

7. The method of claim 6, wherein said first group identification comprises a first peer system identification individually identifying a first of said first plurality of peer systems.

8. The method of claim 6, wherein said first group identification comprises a second group identification collectively identifying a second subset of said first subset of peer systems.

9. The method of claim 8, wherein said second group identification comprises said first group identification.

10. The method of claim 9, wherein said second subset of said first subset of peer systems comprises peer systems of one user.

11. The method of claim 1, wherein said first resource key is randomly generated.

12. The method of claim 1, wherein said first resource key is a symmetric encryption key.

13. The method of claim 1, wherein said first resource key is deterministically generated from a seed.

14. The method of claim 13, wherein said deterministic generation of said first resource key comprises randomly generating and saving a seed value; initializing one or more operational constants to one or more integer values; and applying one or more one way hash functions to the seed value for one or more series of times in view of the one or more operational constants to generate or contribute to the generation of the first resource key.

15. The method of claim 14, wherein said initializing comprises initializing a first operational constant to an integer value N; and said applying comprises applying a first one way hash function to the seed value for a first series of times denoted by the first operational constant.

16. The method of claim 14, wherein said initializing comprises initializing at least a first and a second operational constant to a first and a second integer values N1 and N2, that functionally map to a third integer value N; and said applying comprises applying a first one way hash function to the seed value for a first series of times in view of the first operational constant, and applying said first and a second one way hash function to said seed value for a second and a third series of times in view of said first and second operational constants.

17. The method of claim 1, wherein said obtaining of first encryption public keys of said first plurality of peer systems to be granted access to said first resource after its publication comprises accessing first client key files of said first plurality of peer systems.

18. The method of claim 17, wherein said accessing of first client key files of said first plurality of peer systems comprises accessing a first client key file of a first of said first plurality of peer systems.

19. The method of claim 17, wherein said accessing of first client key files of said first plurality of peer systems comprises accessing a first client key file of a first group of said first plurality of peer systems.

20. The method of claim 1, wherein said generating of a first resource key file for said first resource, including generating for said first plurality of peer systems to be granted access to said first resource after publication, entries of said first resource key of the first resource encrypted using the retrieved first encryption public keys of the first plurality of peer systems to be granted access to said first resource after publication comprises generating a first entry of said first resource key of the first resource encrypted using a first of the retrieved first encryption public keys corresponding to a first of the first plurality of peer systems.

21. The method of claim 20, wherein said first of said first plurality of peer systems is a user peer system.

22. The method of claim 20, wherein said first of said first plurality of peer systems is a gateway separating an internal network and external networks.

23. The method of claim 20, wherein said first of said first plurality of peer systems comprises a search engine.

24. The method of claim 1, wherein said generating of a first resource key file for said first resource, including generating for said first plurality of peer systems to be granted access to said first resource after publication, entries of said first resource key of the first resource encrypted using the retrieved first encryption public keys of the first plurality of peer systems to be granted access to said first resource after publication comprises generating a first entry of said first resource key of the first resource encrypted using a first of the retrieved first encryption public keys corresponding to a first group of the first plurality of peer systems.

25. The method of claim 1, wherein at least one of said generations of encrypted resource keys comprises encrypting the encrypted resource key one or more further times with a password.

26. The method of claim 1, wherein said publishing of the first resource comprises notifying a resource locator server of the availability of the first resource and the associated first resource key file for access by authorized grantee systems including providing said resource locator server with said first resource identification of the first resource and a second resource identification identifying the associated first resource key file.

27. The method of claim 1, wherein said generating of the first resource key file further comprises generating an entry of an obfuscated identification of the first resource encrypted using the first resource key; and said publishing of the first resource comprises notifying a resource locator server of the availability of the first resource and the associated first resource key file for access by authorized grantee systems including providing said resource locator server with a first obfuscated identification of the first resource and a second resource identification identifying the associated first resource key file.

28. The method of claim 1, wherein the method further comprises generating a first access control list for the first resource including said first peer system identifications of said first plurality of peer systems, and said first resource key.

29. The method of claim 1, wherein the method further comprises receiving from a peer system a request for the first resource key file of the first resource; and providing in response to the requesting peer system said first resource key file of the first resource.

30. The method of claim 1, wherein the method further comprises receiving from a peer system a request for the first resource, with the first resource being referenced by said first resource identification; and providing in response to the requesting peer system said first resource in an encrypted form, said first resource being published under said first resource identification.

31. The method of claim 1, wherein the method further comprises receiving from a peer system a request for the first resource, with the first resource being referenced by said first resource identification; and providing in response to the requesting peer system said first resource key file of the first resource, said first resource being published under a first obfuscated identification.

32. The method of claim 1, wherein the method further comprises receiving from a peer system a request for the first resource, with the first resource being referenced by a first obfuscated identification under which the first resource is published; and providing in response to the requesting peer system said first resource in an encrypted form.

33. The method of claim 1, wherein the method further comprises encrypting said first resource using said first resource key.

34. The method of claim 1, wherein said first resource is a selected one of a directory, a sub-directory, a data file and an executable.

35. The method of claim 1, wherein said first resource is a selected one of a directory and a sub-directory, and the method further comprises receiving from a peer system a request for a second resource that is a member of the first directory/sub-directory resource; and providing in response to the requesting peer system the requested second resource encrypted using said first resource key of the first resource, said second resource not having an associated resource key file, and said first resource being the closest ancestor resource having an associated resource key file.

36. The method of claim 1, wherein said first resource is a selected one of a directory and a sub-directory, and the method further comprises receiving a second resource identification of a second resource to be published, and second peer system identifications of a second plurality of peer systems to be granted access to said second resource after its publication, said second resource being a member of said first directory/sub-directory resource; generating a second resource key for use to encrypt the second resource; obtaining second encryption public keys of said second peer systems to be granted access to said second resource after its publication; generating a second resource key file for said second resource, including generating for said second peer systems to be granted access to said second resource after publication, entries of said second resource key of the second resource encrypted using said retrieved second encryption public keys of said second plurality of peer systems to be granted access to said second resource after publication; and publishing the second resource, along with said second resource key file, for selective access by said second plurality of peer systems.

37. The method of claim 36, wherein the method further comprises receiving from a peer system a request for the second resource key file of the second resource; and providing in response to the requesting peer system said second resource key file of the second resource.

38. The method of claim 36, wherein the method further comprises receiving from a peer system a request for the second resource, with the second resource being correctly referenced; and providing in response to the requesting peer system said second resource encrypted using said second resource key.

39. The method of claim 1, wherein the method further comprises generating a selected one of a first signature and a first hash value of the first resource for a first peer system using a first signing private key of the first peer system; and adding said selected one of the first signature and the first hash value to said first resource key file.

40. The method of claim 39, wherein the method further comprises encrypting said selected one of the first signature and the first hash value using said first resource key of the first resource; and said adding comprises adding said encrypted selected one of the first signature and the hash value to said first resource key file.

41. The method of claim 1, wherein the method further comprises generating a selected one of a first signature and a first hash value of a second resource, descendant of said first resource, for a first peer system using a first signing private key of the first peer system; and adding said selected one of the first signature and the first hash value to said first resource key file.

42. The method of claim 41, wherein the method further comprises encrypting said selected one of the first signature and the first hash value using said first resource key of the first resource; and said adding comprises adding said encrypted selected one of the first signature and the first hash value to said first resource key file.

43. A computer implemented method for generating a resource key file for a resource to be published in an encrypted form, the method comprising:
obtaining encryption public keys of a plurality of peer systems within a peer-to-peer network to be granted access to said resource after its publication in said encrypted form; and
generating a plurality of encrypted resource key entries by:
determining omitted peer systems within the peer-to-peer network by determining the first peer systems within the peer-to-peer network to be granted access to said resource after publication for which an entry within the resource file key has not been generated; and
generating an entry for each of the omitted peer systems within the peer-to-peer network by encrypting a resource key of said resource encrypted using corresponding ones of said obtained encryption public keys of said omitted peer systems; such that an encryption public key is obtained from each of the first peer systems within the peer-to-peer network and is included within the resource key.

44. The method of claim 43, wherein said plurality of peer systems comprise a user peer system.

45. The method of claim 43, wherein said plurality of peer systems comprise a gateway separating an internal network and external networks.

46. The method of claim 43, wherein said plurality of peer systems comprise a search engine.

47. The method of claim 43, wherein said obtained encryption public keys comprise a group encryption public key for a subset of said plurality of peer systems which are members of a group.

48. The method of claim 43, wherein the method further comprises generating a selected of a signature and a hash value of the resource for a peer system using a signing private key of the peer system; and adding said selected on of said signature and said hash value to said resource key file.

49. The method of claim 48, wherein the method further comprises the method further comprises encrypting said selected one of the signature and the hash value using said resource key of the resource; and said adding comprises adding said encrypted selected one of the signature and the hash value to said resource key file.

50. The method of claim 43, wherein the method further comprises generating a selected one of a signature and a hash value of a descendant resource of said resource for a peer system using a signing private key of the peer system; adding said selected one of said signature and said hash value to said resource key file.

51. The method of claim 50, wherein the method further comprises the method further comprises encrypting said selected one of the signature and the hash value using said resource key of the resource; and said adding comprises adding said encrypted selected one of the signature and the hash value to said resource key file.

52. A peer system comprising:
storage medium having stored therein a plurality of programming instructions designed to:
enable the peer system to receive a first resource identification of a first resource to be published, and first peer system identifications of a first plurality of other peer systems within a peer-to-peer network to be granted access to said first resource after its publication,
generate a first resource key for use to encrypt the first resource;
obtain first encryption public keys of said first plurality of other peer systems to be granted access to said first resource after its publication; such that an encryption public key is obtained from each of the first peer systems within the peer-to-peer network,
generate a first resource key file for said first resource by:
determine an omitted peer system within the peer-to-peer network by determining one of the plurality of first peer systems within the peer-to-peer network to be granted access to said resource after publication for which an entry within the resource file key has not yet been generated; and
generate an entry for the omitted peer system within the peer-to-peer network by including within the resource key file an entry associated with the omitted peer system within the peer-to-peer network using a retrieved first encryption public key associated with the omitted peer system;

repeat the process of determining an omitted peer system within the peer-to-peer network and generating an entry for each of the omitted peer system within the peer-to-peer network until an entry has been generated for each of the plurality of first peer systems to be granted access to said resource after its publication; and publish the first resource encrypted with said first resource key, along with said first resource key file, for selective access by said first plurality of other peer systems; and a processor coupled to the storage medium to execute the programming instructions.

53. The peer system of claim 52, wherein said first peer system identifications of said first plurality of other peer systems to be granted access to said first resource after its publication comprise a first peer system identification individually identifying a first of said first plurality of other peer systems.

54. The peer system of claim 53, wherein said first of said first plurality of other peer systems is a user peer system.

55. The peer system of claim 53, wherein said first of said first plurality of other peer systems is a gateway separating an internal network and external networks.

56. The peer system of claim 53, wherein said first of said first plurality of other peer systems comprises a search engine.

57. The peer system of claim 52, wherein said first peer system identifications of said first plurality of peer systems to be granted access to said first resource after its publication comprise a first group identification collectively identifying a first subset of said first plurality of other peer systems.

58. The peer system of claim 57, wherein said first group identification comprises a first peer system identification individually identifying a first of said first plurality of other peer systems.

59. The peer system of claim 57, wherein said first group identification comprises a second group identification collectively identifying a second subset of said first subset of peer systems.

60. The peer system of claim 59, wherein said second group identification comprises said first group identification.

61. The peer system of claim 60, wherein said second subset of said first subset of peer systems comprises peer systems of one user.

62. The peer system of claim 52, wherein said first resource key is randomly generated.

63. The peer system of claim 52, wherein said first resource key is a symmetric encryption key.

64. The peer system of claim 52, wherein said first resource key is deterministically generated from a seed.

65. The peer system of claim 64, wherein said programming instructions are designed to enable the peer system to perform said deterministic generation of said first resource key by randomly generating and saving a seed value; initializing one or more operational constants to one or more integer values; and applying one or more one way hash functions to the seed value for one or more series of times in view of the one or more operational constants to generate or contribute to the generation of the first resource key.

66. The peer system of claim 65, wherein said programming instructions are designed to enable the peer system to perform said initializing by initializing a first operational constant to an integer value N; and said applying by applying a first one way hash function to the seed value for a first series of times denoted by the first operational constant.

67. The peer system of claim 65, wherein said programming instructions are designed to enable the peer system to perform said initializing by initializing at least a first and a second operational constant to a first and a second integer values N1 and N2, that functionally map to a third integer value N; and said applying by applying a first one way hash function to the seed value for a first series of times in view of the first operational constant, and applying said first and a second one way hash function to said seed value for a second and a third series of times in view of said first and second operational constants.

68. The peers system of claim 52, wherein said programming instructions are designed to enable the peer system to perform said obtaining of first encryption public keys of said first plurality of other peer systems to be granted access to said first resource after its publication by accessing first client key files of said first plurality of other peer systems.

69. The peer system of claim 68, wherein said programming instructions are designed to enable the peer system to perform said accessing of first client key files of said first plurality of other peer systems by accessing a first client key file of a first of said first plurality of other peer systems.

70. The peer system of claim 68, wherein said programming instructions are designed to enable the peer system to perform said accessing of first client key files of said first plurality of other peer systems by accessing a first client key file of a first group of said first plurality of other peer systems.

71. The peer system of claim 52, wherein said programming instructions are designed to enable the peer system to perform said generating of a first resource key file for said first resource, including generating for said first plurality of other peer systems to be granted access to said first resource after publication, entries of said first resource key of the first resource encrypted using the retrieved first encryption public keys of the first plurality of other peer systems to be granted access to said first resource after publication by generating a first entry of said first resource key of the first resource encrypted using a first of the retrieved first encryption public keys corresponding to a first of the first plurality of other peer systems.

72. The peer system of claim 71, wherein said first of said first plurality of other peer systems is a user peer system.

73. The peer system of claim 71, wherein said first of said first plurality of other peer systems is a gateway separating an internal network and external networks.

74. The peer system of claim 71, wherein said first of said first plurality of other peer systems comprises a search engine.

75. The peer system of claim 72, wherein said programming instructions are designed to enable the peer system to perform said generating of a first resource key file for said first resource, including generating for said first plurality of other peer systems to be granted access to said first resource after publication, entries of said first resource key of the first resource encrypted using the retrieved first encryption public keys of the first plurality of other peer systems to be granted access to said first resource after publication by generating a first entry of said first resource key of the first resource encrypted using a first of the retrieved first encryption public keys corresponding to a first group of the first plurality of other peer systems.

76. The peer system of claim 52, wherein said programming instructions are designed to enable the peer system to perform at least one of said generations of encrypted resource keys by encrypting the encrypted resource key one or more further times with a password.

77. The peer system of claim 52, wherein said programming instructions are designed to enable the peer system to perform said publishing of the first resource by notifying a resource locator server of the availability of the first resource and the associated first resource key file for access by authorized grantee systems including providing said resource locator server with said first resource identification of the first resource and a second resource identification identifying the associated first resource key file.

78. The peer system of claim 52, wherein said programming instructions are designed to enable the peer system to perform said generating of the first resource key file by further generating an entry of an obfuscated identification of the first resource encrypted using the first resource key; and said publishing of the first resource by notifying a resource locator server of the availability of the first resource and the associated first resource key file for access by authorized grantee systems including providing said resource locator server with a first obfuscated identification of the first resource and a second resource identification identifying the associated first resource key file.

79. The peer system of claim 52, wherein said programming instructions are further designed to enable the peer system to generate a first access control list for the first resource including said first peer system identifications of said first plurality of other peer systems, and said first resource key.

80. The peer system of claim 52, wherein said programming instructions are further designed to enable the peer system to receive from a first of said first plurality of other peer systems a request for the first resource key file of the first resource; and provide in response to the requesting first other peer system said first resource key file of the first resource.

81. The peer system of claim 52, wherein said programming instructions are further designed to enable the peer system to receive from a first of said first plurality of other peer systems a request for the first resource, with the first resource being referenced by said first resource identification; and provide in response to the requesting first other peer system said first resource in an encrypted form, said first resource being published under said first resource identification.

82. The peer system of claim 52, wherein said programming instructions are further designed to enable the peer system to receive from a first of the first plurality of other peer systems a request for the first resource, with the first resource being referenced by said first resource identification; and provide in response to the requesting first other peer system said first resource key file of the first resource, said first resource being published under a first obfuscated identification.

83. The peer system of claim 52, wherein said programming instructions are further designed to enable the peer system to receive from a first of the first plurality of other peer systems a request for the first resource, with the first resource being referenced by a first obfuscated identification under which the first resource is published; and provide in response to the requesting first other peer system said first resource in an encrypted form.

84. The peer system of claim 52, wherein said programming instructions are further designed to enable the peer system to encrypt said first resource using said first resource key.

85. The peer system of claim 52, wherein said first resource is a selected one of a directory, a sub-directory, a data file and an executable.

86. The peer system of claim 52, wherein said first resource is a selected one of a directory and a sub-directory, and said programming instructions are further designed to enable the peer system to receive from a first of the first plurality of other peer systems a request for a second resource that is a member of the first directory/sub-directory resource; and provide in response to the requesting the first other peer system the requested second resource encrypted using said first resource key of the first resource, said second resource not having an associated resource key file, and said first resource being the closest ancestor resource having an associated resource key file.

87. The peer system of claim 52, wherein said first resource is a selected one of a directory and a sub-directory, and said programming instructions are further designed to enable the peer system to receive a second resource identification of a second resource to be published, and second peer system identifications of a second plurality of other peer systems to be granted access to said second resource after its publication, said second resource being a member of said first directory/sub-directory resource; generate a second resource key for use to encrypt the second resource; obtain second encryption public keys of said second other peer systems to be granted access to said second resource after its publication; generate a second resource key file for said second resource, including generating for said second other peer systems to be granted access to said second resource after publication, entries of said second resource key of the second resource encrypted using said retrieved second encryption public keys of said second plurality of other peer systems to be granted access to said second resource after publication; and publish the second resource, along with said second resource key file, for selective access by said second plurality of other peer systems.

88. The peer system of claim 87, wherein said programming instructions are further designed to enable the peer system to receive from a first of said first plurality of other peer systems a request for the second resource key file of the second resource; and provide in response to the requesting first other peer system said second resource key file of the second resource.

89. The peer system of claim 87, wherein said programming instructions are further designed to enable the peer system to receive from a first of said first plurality of other peer systems a request for the second resource, with the second resource being correctly referenced; and provide in response to the requesting first other peer system said second resource encrypted using said second resource key.

90. The peer system of claim 52, wherein said programming instructions are further designed to enable the peer system to generate a selected one of a first signature and a first hash value of the first resource for a first other peer system using a first signing private key of the first other peer system; and add said selected one of the first signature and the first hash value to said first resource key file.

91. The peer system of claim 90, wherein said programming instructions are further designed to enable the peer system to encrypt said selected one of the first signature and the first hash value using said first resource key of the first resource; and perform said adding by adding said encrypted selected one of the first signature and the hash value to said first resource key file.

92. The peer system of claim 52, wherein said programming instructions are further designed to enable the peer system to generate a selected one of a first signature and a first hash value of a second resource, descendant of said first resource, for a first other peer system using a first signing private key of the first other peer system; and add said selected one of the first signature and the first hash value to said first resource key file.

93. The peer system of claim 92, wherein said programming instructions are further designed to enable the peer system to encrypt said selected one of the first signature and the first hash value using said first resource key of the first resource; and perform said adding by adding said encrypted selected one of the first signature and the first hash value to said first resource key file.

94. A peer system comprising:
storage medium having stored therein a plurality of programming instructions designed to:
receive from a plurality of other peer systems to be granted access to said resource a public key associated with each of the other peer systems within a peer-to-peer network;
cryptographically sign each of the public keys received to generate encrypted public keys;
transmit each of the cryptographically signed public keys to the system from which the were received for incorporation to a client key file that is published over the peer-to-peer network such that each of the other peer systems are registered with the peer-to-peer network;
enable the peer system to obtain encryption public keys of the plurality of other peer systems to be granted access to said resource after its publication in said encrypted form; such that an encryption public key is obtained from each of the first peer systems within the peer-to-peer network, and generate a plurality of encrypted resource key entries by:
determining omitted peer systems within the peer-to-peer network by determining the first peer systems within the peer-to-peer network to be granted access to said resource after publication for which an entry within the resource file key has not been generated; and
generating an entry for each of the omitted peer systems within the peer- to-peer network by encrypting a resource key of said resource encrypted using corresponding ones of said obtained encryption public keys of said omitted peer systems within the peer-to-peer; and at least one processor coupled to the storage medium to execute the programming instructions.

95. The peer system of claim 94, wherein said plurality of other peer systems comprise a user peer system.

96. The peer system of claim 94, wherein said plurality of other peer systems comprise a gateway separating an internal network and external networks.

97. The peer system of claim 94, wherein said plurality of other peer systems comprise a search engine.

98. The peer system of claim 94, wherein said obtained encryption public keys comprise a group encryption public key for a subset of said plurality of other peer systems which are members of a group.

99. The peer system of claim 94, wherein said programming instructions are further designed to enable the peer system to generate a selected of a signature and a hash value of the resource for a first of said other peer systems using a signing private key of the first other peer system; and add said selected on of said signature and said hash value to said resource key file.

100. The peer system of claim 99, wherein said programming instructions are further designed to enable the peer system to encrypt said selected one of the signature and the hash value using said resource key of the resource; and perform said adding by adding said encrypted selected one of the signature and the hash value to said resource key file.

101. The peer system of claim 94, wherein said programming instructions are further designed to enable the peer system to generate a selected one of a signature and a hash value of a descendant resource of said resource for a first of said other peer systems using a signing private key of the first other peer system; and add said selected one of said signature and said hash value to said resource key file.

102. The peer system of claim 101, wherein said programming instructions are further designed to enable the peer system to encrypt said selected one of the signature and the hash value using said resource key of the resource; and perform said adding comprises adding said encrypted selected one of the signature and the hash value to said resource key file.

* * * * *

UNITED STATES PATENT AND TRADEMARK OFFICE
CERTIFICATE OF CORRECTION

| | |
|---|---|
| PATENT NO. | : 7,509,492 B2 |
| APPLICATION NO. | : 10/473264 |
| DATED | : March 24, 2009 |
| INVENTOR(S) | : Xavier Boyen et al. |

It is certified that error appears in the above-identified patent and that said Letters Patent is hereby corrected as shown below:

In Face page, in field (54), under "Title" column 1, line 1, after "DISTRIBUTED" insert -- , --.

In column 1, line 1, after "DISTRIBUTED" insert -- , --.

Signed and Sealed this
Third Day of May, 2011

David J. Kappos
*Director of the United States Patent and Trademark Office*